United States Patent
Shibata et al.

(10) Patent No.: US 11,886,144 B2
(45) Date of Patent: Jan. 30, 2024

(54) BINDER RESIN COMPOSITION FOR TONER

(71) Applicant: KAO CORPORATION, Tokyo (JP)

(72) Inventors: Motomu Shibata, Takaishi (JP); Shoichi Murata, Wakayama (JP)

(73) Assignee: KAO CORPORATION, Tokyo (JP)

( * ) Notice: Subject to any disclaimer, the term of this patent is extended or adjusted under 35 U.S.C. 154(b) by 92 days.

(21) Appl. No.: 16/979,394

(22) PCT Filed: Feb. 21, 2019

(86) PCT No.: PCT/JP2019/006525
§ 371 (c)(1),
(2) Date: Sep. 9, 2020

(87) PCT Pub. No.: WO2019/176493
PCT Pub. Date: Sep. 19, 2019

(65) Prior Publication Data
US 2021/0003933 A1 Jan. 7, 2021

(30) Foreign Application Priority Data

Mar. 12, 2018 (JP) .................................. 2018-044565
Aug. 1, 2018 (JP) .................................. 2018-145072

(51) Int. Cl.
*G03G 9/087* (2006.01)
*C08G 81/00* (2006.01)
*C08L 87/00* (2006.01)

(52) U.S. Cl.
CPC ......... *G03G 9/08788* (2013.01); *C08G 81/00* (2013.01); *C08L 87/005* (2013.01); *G03G 9/08711* (2013.01); *G03G 9/08755* (2013.01); *G03G 9/08797* (2013.01)

(58) Field of Classification Search
CPC ........... G03G 9/08788; G03G 9/08711; G03G 9/08755; G03G 9/08797
See application file for complete search history.

(56) References Cited

U.S. PATENT DOCUMENTS

| | | | |
|---|---|---|---|
| 5,032,484 A | 7/1991 | Demejo et al. | |
| 9,244,393 B1 | 1/2016 | Inaba et al. | |
| 2011/0250536 A1* | 10/2011 | Veregin .............. | G03G 9/09371 430/124.1 |
| 2014/0186764 A1* | 7/2014 | Yamada ................. | G03G 9/135 430/114 |
| 2014/0295343 A1 | 10/2014 | Tatsuura et al. | |
| 2015/0177630 A1* | 6/2015 | Umeda ................ | G03G 9/0808 430/137.1 |
| 2015/0253686 A1 | 9/2015 | Miyakoshi et al. | |
| 2016/0048097 A1 | 2/2016 | Inaba et al. | |
| 2016/0091811 A1* | 3/2016 | Doi .................... | G03G 9/08755 430/105 |
| 2016/0231663 A1 | 8/2016 | Inaba et al. | |
| 2017/0038699 A1 | 2/2017 | Tatsuura et al. | |

FOREIGN PATENT DOCUMENTS

| | | |
|---|---|---|
| EP | 0 380 813 A1 | 8/1990 |
| JP | 6-136338 A | 5/1994 |
| JP | 10-158625 A | 6/1998 |
| JP | 2003-171486 A | 6/2003 |
| JP | 2010191222 A * | 9/2010 |
| JP | 2014-142624 A | 8/2014 |
| JP | 2014-153670 A | 8/2014 |
| JP | 2014153670 A * | 8/2014 |
| JP | 2015-187696 A | 10/2015 |
| JP | 2016-40573 A | 3/2016 |
| JP | 2016-40576 A | 3/2016 |
| JP | 2016-60902 A | 4/2016 |
| JP | 2016-114829 A | 6/2016 |
| JP | 2017-54025 A | 3/2017 |
| JP | 2017-58591 A | 3/2017 |

OTHER PUBLICATIONS

Specification sheet of 12-hydroxy stearic acid available from Tokyo Chemical Industry Co., Ltd. (Year: 2022).*
English machine translation of the description of JP-2010191222-A (Year: 2010).*
English machine translation of the description of JP-2014153670-A (Year: 2014).*
International Search Report dated May 7, 2019 in PCT/JP2019/006525 filed on Feb. 21, 2019, 2 pages.
Extended European Search Report ddated Oct. 15, 2021 in European Patent Application No. 19767998.8, 10 pages.

* cited by examiner

Primary Examiner — Peter L Vajda
Assistant Examiner — Boone Alexander Evans
(74) Attorney, Agent, or Firm — Oblon, McClelland, Maier & Neustadt, L.L.P.

(57) ABSTRACT

Provided are a binder resin composition for toner excellent in low-temperature fusing property, storage stability and durability, a toner for developing electrostatic images that contains the binder resin composition for toner, and a method for producing the binder resin composition for toner. The binder resin composition for toner contains a resin composition (C-P) prepared by condensing an acid group-having crystalline resin (C) and a polyalkyleneimine, and an amorphous resin (A).

21 Claims, No Drawings

BINDER RESIN COMPOSITION FOR TONER

FIELD OF THE INVENTION

The present invention relates to a binder resin composition for toner, a toner for developing electrostatic images containing the binder resin composition for toner, and a method for producing the binder resin composition for toner.

BACKGROUND OF THE INVENTION

In the field of electrophotography, it is desired to develop a toner for developing electrostatic images (hereinafter may be simply referred to as "toner") that can enhance picture quality and can satisfy speed-up technique with the development of electrophotographic systems. For example, for corresponding with speed-up machines, a toner is required to have an excellent low-temperature fusing property.

However, in producing a large amounts of prints using a toner has a good low-temperature fusing property, the toner may fuse and/or firmly stick to a developing roll of an electrophotographic system to form streaks on the printed images and there often occurs a problem in point of the durability of the toner. Accordingly, a toner that satisfies both low-temperature fusing property and durability is desired.

For example, JP 2016-114829 A describes a toner for electrophotography which contains a crystalline composite resin that contains a polycondensed resin component prepared by polycondensation of an alcohol component containing a specific aliphatic diol and a specific aliphatic carboxylic acid, and a styrenic resin component; an amorphous composite resin that contains a polycondensed resin component prepared by polycondensation of an alcohol component and an aromatic dicarboxylic acid component, and a styrenic resin component; and a releasing agent, which satisfies a specific average degree of circularity, and which is such that the content of particles having a particle size of 3 μm or less in the toner is 5.0% by number or less.

JP 2017-58591 A describes a toner which contains a binder resin and which is surface-modified with a polymer amine and is further surface-modified with a silicone-acrylic copolymer.

U.S. Pat. No. 5,032,484 describes a toner composition which contains toner particles having a specific average particle size and which has the ability to adhere to paper after thermal fusion, and in which the toner particles contain a thermoplastic polymer having a specific glass transition temperature, the polymer contains, as dispersed therein, a specific amount of a colorant, a specific amount of at least one benzenesulfonic acid-fatty acid ammonium salt, a specific amount of at least one polydimethylsiloxane copolymer, and a specific amount of at least one crystalline polyethyleneimine.

SUMMARY OF THE INVENTION

The present invention relates to a binder resin composition for toner, which contains a resin composition (C-P) prepared by condensing an acid group-having crystalline resin (C) and a polyalkyleneimine, and an amorphous resin (A).

DETAILED DESCRIPTION OF THE INVENTION

For improving the low-temperature fusing property of a toner, when the softening point and the glass transition temperature of the toner are planned to be low, there occurs a negative effect that the storage stability of the toner lowers, and therefore, it is desired to develop a toner excellent in low-temperature fusing property, storage stability and durability.

Therefore, the present invention relates to a binder resin composition for toner excellent in low-temperature fusing property, storage stability and durability, a toner for developing electrostatic images containing the binder resin composition for toner, and a method for producing the binder resin composition for toner.

From a different viewpoint, even when the low-temperature fusing property of toner could be improved, the low-temperature fusing property may lower in long-term storage. Further, in such long-term storage, the electrostatic property may also lower.

Therefore, the present invention relates to a binder resin composition for toner excellent in low-temperature fusing property, aging stability of low-temperature fusing property and charge stability in some aspect, a toner for developing electrostatic images containing the binder resin composition for toner, and a method for producing the binder resin composition for toner.

The present inventors have found that a binder resin composition for toner containing a resin composition (C-P) prepared by condensing an acid group-having crystalline resin (C) and a polyalkyleneimine, and an amorphous resin (A) can solve the problems of low-temperature fusing property, storage stability and durability.

The present inventors have also found that, when the difference in a Fedors solubility parameter (SP value) between the crystalline resin (C) and the amorphous resin (A) is 1.3 $(cal/cm^3)^{1/2}$ or less, the problems of low-temperature fusing property, aging stability of low-temperature fusing property and charge stability can be solved.

Specifically, the present invention relates to the following embodiments.

[1] A binder resin composition for toner, containing a resin composition (C-P) prepared by condensing an acid group-having crystalline resin (C) and a polyalkyleneimine, and an amorphous resin (A).

[2] The binder resin composition for toner according to [1], wherein the difference in a Fedors solubility parameter (SP value) between the crystalline resin (C) and the amorphous resin (A) is 1.3 $(cal/cm^3)^{1/2}$ or less.

[3] A toner for developing electrostatic images, containing the binder resin composition of the above [1] or [2].

[4] A method for producing a binder resin composition for toner, including:

Step 1: a step of condensing an acid group-having crystalline resin (C) and a polyalkyleneimine to give a resin composition (C-P), and Step 2: a step of mixing the resin composition (C-P) and an amorphous resin (A).

[5] The method for producing a binder resin composition for toner according to [4], wherein the difference in a Fedors solubility parameter (SP value) between the crystalline resin (C) and the amorphous resin (A) is 1.3 $(cal/cm^3)^{1/2}$ or less.

According to the present invention, there can be provided a binder resin composition for toner excellent in low-temperature fusing property, storage stability and durability, a toner for developing electrostatic images containing the binder resin composition for toner, and a method for producing the binder resin composition for toner.

According to the above-mentioned embodiments [2] and [5], there can be provided a binder resin composition for toner excellent in low-temperature fusing property, aging stability of low-temperature fusing property and charge property after storage, a toner for developing electrostatic images containing the binder resin composition for toner, and a method for producing the binder resin composition for toner.

[Binder Resin Composition for Toner]

The binder resin composition for toner of the first embodiment of the present invention (hereinafter may be simply referred to as "binder resin composition") contains a resin composition (C-P) (hereinafter may be simply referred to as "resin composition (C-P)") prepared by condensing an acid group-having crystalline resin (C) (hereinafter may be simply referred to as "resin (C)") and a polyalkyleneimine, and an amorphous resin (A) (hereinafter may be simply referred to as "resin (A)").

According to the first embodiment of the present invention, there can be provided a binder resin composition for toner excellent in low-temperature fusing property, storage stability and durability, a toner for developing electrostatic images containing the binder resin composition for toner, and a method for producing the binder resin composition for toner.

The binder resin composition for toner of the second embodiment of the present invention (hereinafter may be simply referred to as "binder resin composition") contains a resin composition (C-P) prepared by condensing an acid group-having crystalline resin (C) and a polyalkyleneimine, and an amorphous resin (A), wherein the difference in a Fedors solubility parameter (hereinafter may be simply referred to as "SP value") between the crystalline resin (C) and the amorphous resin (A) is 1.3 $(cal/cm^3)^{1/2}$ or less.

According to the second embodiment of the present invention, there can be provided a binder resin composition for toner excellent in low-temperature fusing property, aging stability of low-temperature fusing property and charge property after storage, a toner for developing electrostatic images containing the binder resin composition for toner, and a method for producing the binder resin composition for toner.

The reason why the toner for developing electrostatic images containing the binder resin composition for toner of the first embodiment of the present invention is excellent in low-temperature fusing property, storage stability and durability is, though not clear, considered to be as follows.

For improving the low-temperature fusing property of toner, use of a crystalline resin is general, and by finely dispersing a crystalline resin in an amorphous resin, the amorphous resin is plasticized during fusing process to express a low-temperature fusing property. The toner of the first embodiment of the present invention contains a polyalkyleneimine-derived moiety in the resin composition (C-P), in which the moiety forms an acid-base interaction with the acid group moiety in the acid group-having crystalline resin (C) and the acid group-having amorphous resin (A), and the resin composition (C-P) acts as a dispersant for the acid group-having resin (C), and accordingly, it is considered that the acid group-having resin (C) and the resin composition (C-P) can be finely dispersed in the acid group-having resin (A) to better the low-temperature fusing property.

In general, an incompatible combination of a crystalline resin and an amorphous resin betters storage stability but worsens a low-temperature fusing property. In the first embodiment of the present invention, the resin composition (C-P) and the acid group-having resin (C) finely disperse in the acid group-having resin (A) owing to the above-mentioned acid-base interaction, and therefore it is considered that both the low-temperature fusing property and the storage stability can be bettered.

In general, a crystalline resin has a lower glass transition temperature than an amorphous resin and, when existing in the surface of toner, it worsens durability. It is considered that the resin (C) is finely dispersed in the toner to prevent it from being exposed out on the surface so as to retard durability degradation, and therefore the durability can be thereby improved.

Though not clear, the reason why the toner of the second embodiment of the present invention is excellent in low-temperature fusing property, aging stability of low-temperature fusing property and charge property after storage is considered to be as follows.

For improving the low-temperature fusing property of the toner of the second embodiment, use of a crystalline polyester is general, and when the SP value between the resin (C) and the resin (A) is smaller, the resins can be more readily plasticized during fusing to express a good low-temperature fusing property.

However, in general, the resin (C) often forms a large domain of the resin (C) during long-term storage to worsen a low-temperature fusing property, and the resin (C) may be exposed out on the surface of toner to worsen charge property. The toner of the second embodiment contains a polyalkyleneimine in the resin (C) and forms acid-base interaction with the carboxylic acid moiety in the resin so that the resin (C) can exist stably in the resin (A). Namely, during long-term storage, it is considered that the resin (C) does not form a large domain and is prevented from being exposed out on the surface, and therefore the aging stability of low-temperature fusing property and charge property after storage can be thereby bettered.

The crystallinity of resin can be expressed by a crystallinity index defined by a ratio of the softening point to the endothermic maximum peak temperature in differential scanning calorimetry (DSC), that is, "softening point/endothermic maximum peak temperature". In general, when the crystallinity index is more than 1.4, the resin is amorphous, and when it is less than 0.6, the crystallinity is low and the amorphous moiety in the resin is large. In the present invention, "crystalline resin" means a resin having a crystallinity index of 0.6 or more, preferably 0.7 or more, more preferably 0.9 or more, and is 1.4 or less, preferably 1.2 or less; and "amorphous resin" means a resin having a crystallinity index of more than 1.4 or less than 0.6.

The above-mentioned "endothermic maximum peak temperature" indicates a peak temperature for a maximum peak area among the endothermic peaks observed under the condition of the measurement method described in the section of Examples.

The crystallinity of resin can be controlled by the kind and the ratio of the raw material monomer, and the production conditions (for example, reaction temperature, reaction time, cooling speed).

The "solubility parameter value" or "SP value" in this description is one calculated according to the method proposed by Fedors et al., and described in "POLYMER ENGINEERING AND SCIENCE, February, 1974, Vol. 14, No. 2, ROBERT F. FEDORS (pp. 147 to 154)".

<Resin Composition (C-P)>

The resin composition (C-P) for use in the present invention is prepared by condensing an acid group-having crystalline resin (C) and a polyalkyleneimine. As described above, the resin composition (C-P) contains an unreacted resin (C) or a remaining polyalkyleneimine, as well as a polyalkyleneimine-derived structure that the reaction product of a resin (C) and a polyalkyleneimine and a polyalkyleneimine-derived side product have. With that, it is considered that the polyalkyleneimine and the polyalkyleneimine-derived structure may form acid-base interaction with the acid group in the resin composition (C-P) and the resin (A). Also it is considered that, according to the interaction, the resin (C) and the resin composition (C-P) are finely dispersed in the acid group-having amorphous resin (A) to improve the low-temperature fusing property of the resultant toner.

(Acid Group-Having Crystalline Resin (C))

The acid group-having crystalline resin (C) for use in the present invention is preferably crystalline polyester-based resin such as a crystalline polyester and a crystalline composite resin having a polyester segment and a vinylic resin segment, and is more preferably a crystalline polyester.

The crystalline polyester is a polycondensate of an alcohol component (c-al) and a carboxylic acid component (c-ac).

In the present invention, "polyester-based resin" may contain a polyester modified in such a degree that would not substantially detract from the characteristics thereof. Examples of the modified polyester include an urethane-modified polyester in which the polyester is modified with an urethane bond, an epoxy-modified polyester in which the polyester is modified with an epoxy bond, and a composite resin having a polyester component and an addition polymer-based resin component. "Polyester" means an unmodified "polyester".

[Alcohol Component (c-Al)]

The alcohol component (c-al) preferably contains an $\alpha,\omega$-aliphatic diol. In the first embodiment, the carbon number of the $\alpha,\omega$-aliphatic, diol is preferably 2 or more, more preferably 6 or more, even more preferably 11 or more, and is preferably 16 or less, more preferably 14 or less, even more preferably 12 or less, from the viewpoint of more improving low-temperature fusing property, storage stability and durability.

In the second embodiment, the carbon number of the $\alpha,\omega$-aliphatic diol is, from the viewpoint of more improving low-temperature fusing property, aging stability of low-temperature fusing property and charge property after storage, preferably 2 or more, more preferably 4 or more, even more preferably 6 or more, and is preferably 16 or less, more preferably 10 or less, even more preferably 8 or less.

Examples of the $\alpha,\omega$-aliphatic diol include ethylene glycol, 1,3-propanediol, 1,4-butane-diol, 1,5-pentanedial, 1,6-hexanediol, 1,7-heptanediol, 1,8-octanediol, 1,9-nonanediol, 1,10-decanediol, 1,11-undecanediol, 1,12-dodecanediol, 1,13-tridecanediol, and 1,14-tetradecanediol. Among these, in the first embodiment, from the viewpoint of easily obtaining a toner excellent in the balance of various characteristics of low-temperature fusing property, storage stability and durability, ethylene glycol, 1,4-butanediol, 1,6-hexanediol, 1,10-decanediol and 1,12-dodecanediol are preferred, and from the viewpoint of easily obtaining a toner more excellent in durability, 1,12-dodecanediol is preferred.

Among these, in the second embodiment, ethylene glycol, 1,4-butanediol, 1,6-hexanediol, 1,10-decanediol and 1,12-dodecanediol are preferred, ethylene glycol, 1,4-butanediol and 1,6-hexanediol are more preferred; and 1,6-hexanediol is even more preferred, from the viewpoint of more improving low-temperature fusing property, aging stability of low-temperature fusing property and charge property after storage.

The content of the $\alpha,\omega$-aliphatic diol in the alcohol component (c-al) is preferably 80 mol % or more, more preferably 85 mol % or more, even more preferably 90 mol % or more, further more preferably 95 mol % or more, and is 100 mol % or less, further more preferably 100 mol %.

The alcohol component (c-al) may contain any other alcohol component different from an $\alpha,\omega$-aliphatic diol. Examples of the other alcohol component include an aliphatic diol except an $\alpha,\omega$-aliphatic diol, and an aromatic diol, an alicyclic diol and a trihydric or higher polyalcohol.

Examples of the aromatic alcohol include bisphenol A ($C_{1-4}$) alkylene oxide adducts (average addition molar number, 1 to 16) such as 2,2-bis(4-hydroxyphenyl)propane polyoxypropylene adduct, and 2,2-bis(4-hydroxyphenyl)propane polyoxyethylene adduct.

Examples of the alicyclic diol include hydrogenated bisphenol A [same as 2,2-bis(4-hydroxycyclohexyl)propane], and hydrogenated bisphenol A ($C_{2-4}$) alkylene oxide adducts (average addition molar number, 2 to 12).

Examples of the trihydric or higher polyalcohol include glycerin, pentaerythritol, trimethylolpropane, sorbitol, and sorbitan.

One alone or two or more kinds of these alcohol components may be used either singly or as combined. From the viewpoint of controlling the molecular weight and the softening point of the resultant polyesters, the alcohol component (c-al) may optionally contain a monohydric alcohol.

[Carboxylic Acid Component (c-ac)]

In the first embodiment, the carboxylic acid component that the carboxylic acid component (c-ac) contains is preferably an $\alpha,\omega$-aliphatic dicarboxylic acid having 10 or more and 14 or less carbon atoms. The $\alpha,\omega$-aliphatic dicarboxylic acid is preferably an $\alpha,\omega$-linear aliphatic dicarboxylic acid, from the viewpoint of easily obtaining a toner excellent in the balance of various characteristics of low-temperature fusing property, storage stability and durability.

The $\alpha,\omega$-aliphatic dicarboxylic acid having 10 or more and 14 or less carbon atoms is preferably sebacic acid, dodecanedioic acid, or tetradecanedioic acid, from the viewpoint of easily obtaining a toner excellent in the balance of various characteristics of low-temperature fusing property, storage stability and durability.

The content of the $\alpha,\omega$-aliphatic dicarboxylic acid having 10 or more and 14 or less carbon atoms in the carboxylic acid component (c-ac) is preferably 85 mol % or more, more preferably 90 mol % or more, even more preferably 95 mol % or more, and is 100 mol % or less, preferably 100 mol %.

The carboxylic acid component (c-ac) may contain any other aliphatic dicarboxylic acid than the $\alpha,\omega$-aliphatic dicarboxylic acid having 10 or more and 14 or less carbon atoms, an aromatic dicarboxylic acid, an alicyclic dicarboxylic acid, and a tribasic or higher polycarboxylic acid, within a range not detracting from the advantageous effects of the present invention.

Examples of the other aliphatic dicarboxylic acid than the $\alpha,\omega$-aliphatic dicarboxylic acid having 10 or more and 14 or less carbon atoms include oxalic acid, malonic acid, fumaric acid, maleic acid, citraconic acid, itaconic acid, glutaconic acid, succinic acid, adipic acid, and azelaic acid.

Examples of the aromatic dicarboxylic acid, the alicyclic dicarboxylic acid and the tribasic or higher polycarboxylic acid are the same as those to be exemplified hereinunder for the carboxylic acid component that the carboxylic acid component (a-ac) to be mentioned below contains.

In the second embodiment, the carboxylic acid component that the carboxylic acid component (c-ac) contains is preferably an $\alpha,\omega$-aliphatic dicarboxylic acid having 4 or more and 14 or less carbon atoms, or an aromatic dicarboxylic acid, from the viewpoint of more improving low-temperature fusing property, aging stability of low-temperature fusing property, and charge property after storage. The α,ω-aliphatic dicarboxylic acid is preferably an α,ω-linear aliphatic dicarboxylic acid.

The α,ω-aliphatic dicarboxylic acid having 4 or more and 14 or less carbon atoms is, preferably succinic acid, fumaric acid or sebacic acid, more preferably fumaric acid, from the viewpoint of easily obtaining a toner excellent in the balance of various characteristics of low-temperature fusing property, aging stability of low-temperature fusing property, and charge property after storage.

The content of the α,ω-aliphatic dicarboxylic acid having 4 or more and 14 or less carbon atoms in the carboxylic acid component (c-ac) is preferably 85 mol % or more, more preferably 90 mol % or more, even more preferably 95 mol % or more, and is 100 mol % or less, preferably 100 mol %.

The aromatic dicarboxylic acid is preferably phthalic acid, isophthalic acid or terephthalic acid, and more preferably terephthalic acid, from the viewpoint of easily obtaining a toner excellent in the balance of various characteristics of low-temperature fusing property, aging stability of low-temperature fusing property, and charge property after storage.

The content of the aromatic dicarboxylic acid in the carboxylic acid component (c-ac) is preferably 85 mol % or more, more preferably 90 mol % or more, even more preferably 95 mol % or more, and is 100 mol % or less, preferably 100 mol %.

The carboxylic acid component (c-ac) may contain any other aliphatic dicarboxylic acid than the α,ω-aliphatic dicarboxylic acid having 4 or more and 14 or less carbon atoms, and an alicyclic dicarboxylic acid and a tribasic or higher polycarboxylic acid, within a range not detracting from the advantageous effects of the present invention.

Both in the first embodiment and in the second embodiment, one alone or two or more kinds of these carboxylic acid components may be used either singly or as combined. From the viewpoint of controlling the molecular weight and the softening point of the resultant polyester, the carboxylic acid component (c-ac) may optionally contain a monocarboxylic acid.

In this description, the carboxylic acid component contains not only the compound alone but also an anhydride to decompose during reaction to form an acid, and an alkyl ester of each carboxylic acid (in which the alkyl group has 1 or more and 3 or less carbon atoms). Also in this description, in the case where the exemplified carboxylic acid component is described merely as the name of a carboxylic acid (free acid) (excepting in the description of Examples), the description thereof includes also an acid anhydride and an alkyl ester having 1 or more and 3 or less carbon atoms of the carboxylic acid. Specifically, a mere description of "trimellitic acid" includes a description of "trimellitic acid, trimellitic anhydride (same as "anhydrous trimellitic acid"), and an alkyl ester having 1 or more and 3 or less carbon atoms of trimellitic acid".

The equivalent ratio of the carboxy group (COOH group) of the carboxylic acid component (c-ac) to the hydroxy group (OH group) of the alcohol component (c-al) [COOH group/OH group] is preferably 0.7 or more, more preferably 0.8 or more, and is preferably 1.3 or less, more preferably 1.2 or less.

The content of the crystalline polyester-based resin in the resin (C) is preferably 70% by mass or more, more preferably 80% by mass or more, even more preferably 90% by mass or more, and is 100% by mass or less, preferably 100% by mass.

The content of the crystalline polyester in the resin (C) is preferably 70% by mass or more, more preferably 80% by mass or more, even more preferably 90% by mass or more, and is 100% by mass or less, preferably 100% by mass, from the viewpoint of easily obtaining a toner excellent in the balance of various characteristics of low-temperature fusing property, storage stability, and durability, or from the viewpoint of more improving aging stability of low-temperature fusing property and charge property after storage.

The softening point of the resin (C) is preferably 60° C. or higher, more preferably 70° C. or higher, even more preferably 75° C. or higher, from the viewpoint of more improving the storage stability and the durability of toner, or from the viewpoint of more improving the aging stability of low-temperature fusing property and the charge property after storage thereof, and is preferably 150° C. or lower, more preferably 120° C. or lower, even more preferably 100° C. or lower, from the viewpoint of more improving the low-temperature fusing property.

The melting point of the resin (C) is preferably 50° C. or higher, more preferably 60° C. or higher, even more preferably 65° C. or higher, from the viewpoint of more improving the storage stability and the durability of toner, or from the viewpoint of more improving the aging stability of low-temperature fusing property and the charge property after storage thereof, and is preferably 130° C. or lower, more preferably 100° C. or lower, even more preferably 95° C. or lower, from the viewpoint of more improving the low-temperature fusing property of toner.

The acid value of the resin (C) is preferably 2 mgKOH/g or more, more preferably 5 mgKOH/g or more, even more preferably 10 mgKOH/g or more, and is preferably 40 mgKOH/g or less, more preferably 30 mgKOH/g or less, even more preferably 20 mgKOH/g or less, from the viewpoint of improving reactivity with a polyalkyleneimine, and from the viewpoint of easily obtaining a toner excellent in the balance of various characteristics of low-temperature fusing property, storage stability and durability, or from the viewpoint of easily obtaining a toner excellent in the balance of various characteristics of low-temperature fusing property, aging stability of low-temperature fusing property, and charge property after storage.

In the second embodiment, the SP value of the resin (C) is preferably 9.5 $(cal/cm^3)^{1/2}$ or more, more preferably 9.8 $(cal/cm^3)^{1/2}$ or more, even more preferably 10.0 $(cal/cm^3)^{1/2}$ or more, and is preferably 12.5 $(cal/cm^3)^{1/2}$ or less, more preferably 12.3 $(cal/cm^3)^{1/2}$ or less, even more preferably 12.1 $(cal/cm^3)^{1/2}$ or less, and further more preferably 11.9 $(cal/cm^3)^{1/2}$ or less, from the viewpoint of more improving low-temperature fusing property, aging stability of low-temperature fusing property, and charge property after storage.

The softening point, the melting point and the acid value of the resin (C) can be appropriately controlled by the kind and the ratio of the raw material monomer, and the production conditions such as the reaction temperature, the reaction time, and the cooling speed. The values can be determined according to the methods described in the section of Examples given hereinunder. In the case where two or more kinds of resins (C) are used as combined, preferably, the values of the softening point, the melting point and the acid value of the mixture of the resins each fall within the above-mentioned range.

In the case where the resin (C) is a crystalline polyester, the crystalline polyester can be prepared, for example, by polycondensing the alcohol component (c-al) and the carboxylic acid component (c-ac).

As needed, the polycondensation of the alcohol component (c-al) and the carboxylic acid component (c-ac) can be carried out in the presence of any other raw material component (e), an esterification catalyst, an esterification promoter and a polymerization inhibitor to be mentioned below.

The polycondensation can be carried out in an inert gas atmosphere such as nitrogen.

Examples of the esterification catalyst include tin catalysts and titanium catalysts. Examples of tin catalysts include dibutyltin oxide, and tin(II) di-(2-ethylhexanoate). From the viewpoint of reactivity, molecular weight control and control of resin properties, a tin(II) compound not having an Sn—C bond such as tin(II) di-(2-ethylhexanoate) is preferred. Examples of titanium catalysts include titanium compounds such as titanium diisopropylate bistriethanolaminate.

In the case of using an esterification catalyst, the blending amount of the esterification catalyst is preferably 0.01 parts by mass or more, more preferably 0.1 parts by mass or more, and is preferably 1.5 parts by mass or less, more preferably 1 part by mass or less, relative to 100 parts by mass of the total amount of the raw material monomers for the resin (C) to be subjected to polycondensation reaction, for example, in the case of using an alcohol component (c-al) and a carboxylic acid component (c-ac) alone as the raw material monomers, relative to 100 parts by mass of the total of the alcohol component (c-al) and the carboxylic acid component (c-ac).

Examples of the esterification promoter include pyrogallol compounds. Pyrogallol compounds have a benzene ring in which three adjacent hydrogen atoms each are substituted with a hydroxy group, and examples thereof include pyrogallol, gallic acid, gallic acid esters, benzophenone derivatives such as 2,3,4-trihydroxybenzophenone and 2,2',3,4-tetrahydroxybenzophenone; and catechin derivatives such as epigallocatechin, and epigallocatechin gallate. Among these, gallic aid is preferred.

In the case of using an esterification promoter, the blending amount of the esterification promoter is preferably 0.001 parts by mass or more, more preferably 0.005 parts by mass or more, even more preferably 0.01 parts by mass or more, and is preferably 1 part by mass or less, more preferably 0.4 parts by mass or less, even more preferably 0.2 parts by mass or less, relative to 100 parts by mass of the total amount of the raw material monomers for the resin (C) to be subjected to polycondensation reaction, for example, in the case of using an alcohol component (c-al) and a carboxylic acid component (c-ac) alone as the raw material monomers, relative to 100 parts by mass of the total of the alcohol component (c-al) and the carboxylic acid component (c-ac), from the viewpoint of reactivity.

Examples of the polymerization inhibitor include radical polymerization inhibitors such as 4-tert-butylcatechol.

In the case of using a polymerization inhibitor, the blending amount of the polymerization inhibitor is, for example, in the case of using an alcohol component (c-al) and a carboxylic acid component (c-ac) alone as the raw material monomers, preferably 0.001 parts by mass or more and is preferably 0.5 parts by mass or less, relative to 100 parts by mass of the total of the alcohol component (c-al) and the carboxylic acid component (c-ac).

The temperature in polycondensation of the component (c-al) and the carboxylic acid component (c-ac) is preferably 120° C. or higher, more preferably 140° C. or higher, even more preferably 180° C. or higher, and is preferably 250° C. or lower, more preferably 240° C. or lower, even more preferably 230° C. or lower. Preferably, by reducing the pressure in the reaction system in a second half of polymerization, the reaction is promoted to control the resultant resin (C) so as to have a desired softening point.

(Polyalkyleneimine)

The polyalkyleneimine for use in the present invention is preferably a polyalkyleneimine in which the alkylene group has 1 or more and 5 or less carbon atoms. A polyalkyleneimine is a compound that reacts with the acid group of the resin (C) through condensation so as to be taken in the molecular skeleton of the resin (C), and an unreacted remaining polyalkyleneimine and a polyalkyleneimine-derived side products may also be contained in the resin composition (C-P).

The polyalkyleneimine in which the alkylene group has 1 or more and 5 or less carbon atoms is preferably a polyalkyleneimine in which the alkylene group has 2 or more and 4 or less carbon atoms, more preferably a polyethyleneimine or a polypropyleneimine, and even more preferably a polyethyleneimine. One alone or two or more kinds of these polyalkyleneimines can be used either singly or as combined.

The proportion of the polyalkyleneimine is preferably 0.05% by mass or more, more preferably 0.1% by mass or more, and is preferably 1% by mass or less, more preferably 0.5% by mass or less, relative to the total amount of the resin composition (C-P) and the amorphous resin (A) to be mentioned below, from the viewpoint of obtaining a toner excellent in the balance of various characteristics of low-temperature fusing property, storage stability, and durability, or from the viewpoint of obtaining a toner excellent in the balance of various characteristics of aging stability of low-temperature fusing property, and charge property after storage.

The proportion of the polyalkyleneimine also contains the contents of unreacted remaining polyalkyleneimine and the polyalkyleneimine-derived side products contained in the resin composition (C-P) as mentioned above, in addition to the polyalkyleneimine taken in the molecular skeleton of the resin (C) as a result of condensation with the acid group of the resin (C). Accordingly, the proportion of the polyalkyleneimine can also be calculated as the blending amount of the polyalkyleneimine used in condensation.

The number-average molecular weight of the polyalkyleneimine is preferably 150 or more, more preferably 500 or more, even more preferably 800 or more, further more preferably 1,000 or more, and is preferably 10,000 or less, more preferably 5,000 or less, even more preferably 4,000 or less, further more preferably 3,000 or less, further more preferably 2,000 or less, from the viewpoint of obtaining a toner excellent in the balance of various characteristics of low-temperature fusing property, storage stability, and durability.

The number-average molecular weight of the polyalkyleneimine is preferably 150 or more, more preferably 200 or more, and is preferably 5,000 or less, more preferably 3,000 or less, even more preferably 2,000 or less, further more preferably 1,000 or less, further more preferably 500 or less, from the viewpoint of obtaining a toner excellent in the balance of various characteristics of aging stability of low-temperature fusing property, and charge property after storage.

The weight-average molecular weight of the polyalkyleneimine is preferably 500 or more, more preferably 1,000 or more, even more preferably 1,200 or more, further more preferably 1,800 or more, and is preferably 10,000 or less, more preferably 8,000 or less, even more preferably 4,000 or less, further more preferably 3,000 or less, from the viewpoint of obtaining a toner excellent in the balance of various characteristics of low-temperature fusing property, storage stability, and durability.

The value of the molecular weight can be determined according to the method described in the section of Examples.

The resin composition (C-P) for use in the present invention is prepared by condensing an acid group-having crystalline resin (C) and a polyalkyleneimine, as described above.

The production method for the resin composition (C-P) is the same as the step 1 for the production method for a binder resin composition for toner to be described hereinunder, and its description is omitted here.

<Amorphous Resin (A)>

The amorphous resin (A) for use in the present invention is preferably one or more selected from the group consisting of an amorphous polyester-based resin such as an amorphous polyester and an amorphous composite resin having a polyester segment and a vinylic resin segment, and a styrene-acrylic resin, and is, from the viewpoint of more improving the storage stability and the durability of toner, more preferably an amorphous polyester-based resin, even more preferably an amorphous polyester.

The amorphous polyester is a polycondensate of an alcohol component (a-al) and a carboxylic acid component (a-ac).

[Alcohol Component (a-al)]

The alcohol component (a-al) is preferably one containing one or more selected from the group consisting of a bisphenol A alkyleneoxide adduct (hereinafter also referred to as "BPA-AO") and an aliphatic diol having 2 or more and 6 or less carbon atoms, more preferably containing BPA-AO, from the viewpoint of obtaining a toner excellent in the balance of various characteristics of low-temperature fusing property, storage stability, and durability.

BPA-AO is preferably BPA-AO represented by the following general formula (I):

(I)

In the general formula (I), $OR^{11}$ and $R^{12}O$ each independently represent an alkyleneoxy group having 1 or more and 4 or less carbon atoms, preferably an ethyleneoxy group or a propyleneoxy group.

x and y each are an average addition molar number of alkyleneoxide, and are independently a positive number. From the viewpoint of obtaining a toner excellent in the balance of various characteristics of low-temperature fusing property, storage stability, and durability, the average value of the sum of x and y is preferably 1 or more, more preferably 1.5 or more, and is preferably 16 or less, more preferably 8 or less, even more preferably 4 or less.

BPA-AO represented by the general formula (I) is preferably a bisphenol A propylene oxide adduct (hereinafter also referred to as "BPA-PO"), or a bisphenol A ethylene oxide adduct (hereinafter also referred to as "BPA-EO"), more preferably BPA-PO.

One alone or two or more kinds of BPA-AO represented by the general formula (I) may be used either singly or as combined, and combined use of BPA-EO and BPA-PO is preferred, from the viewpoint of more improving the storage stability and durability of toner.

In the case where the alcohol component (a-al) contains BPA-AO, the content of BPA-AO in the alcohol component (a-al) is preferably 80 mol % or more, more preferably 90 mol % or more, even more preferably 95 mol % or more, further more preferably 98 mol % or more, and is 100 mol % or less, further more preferably 100 mol %.

Examples of the aliphatic diol having 2 or more and 6 or less carbon atoms include ethylene glycol, 1,2-propanediol, 1,3-propanediol, 1,2-butanediol, 1,3-butanediol, 1,4-butanediol, 2,3-butanediol, neopentyl glycol, 1,4-butenediol, 1,2-pentanediol, 1,4-pentanediol, 2,4-pentanediol, 1,5-pentanediol, 1,2-hexanediol, 1,5-hexanediol, 2,5-hexanediol, 1,6-hexanediol, and 3,3-dimethyl-1,2-butanediol. Among these, one or more selected from the group consisting of 1,2-propanediol and 1,4-butanediol is preferred, from the viewpoint of obtaining a toner excellent in the balance of various characteristics of low-temperature fusing property, storage stability, and durability, and 1,2-propanediol is more preferred from the viewpoint of more improving the low-temperature fusing property of toner. Also, a combination of 1,2-propanediol and 1,4-butanediol is more preferred, from the viewpoint of more improving storage stability and durability of toner.

In the case where the alcohol component (a-al) contains an aliphatic diol having 2 or more and 6 or less carbon atoms, preferably, the component contains an aliphatic diol having 3 or more and 6 or less carbon atoms and having a hydroxy group bonding to the secondary carbon atom thereof.

Examples of the aliphatic diol having 3 or more and 6 or less carbon atoms and having a hydroxy group bonding to the secondary carbon atom thereof include 1,2-propanediol, 1,2-butanediol, 1,3-butanediol, 2,3-butanediol, 1,2-pentanediol, 1,4-pentanediol, 2,4-pentanediol, 1,2-hexanediol, 1,5-hexanediol, 2,5-hexanediol, and 3,3-dimethyl-1,2-butanediol, and the aliphatic diol is preferably one or more selected from 1,2-propanediol and 2,3-butanediol, more preferably 1,2-propanediol.

In the case where the alcohol component (a-al) contains an aliphatic diol having 3 or more and 6 or less carbon atoms and having a hydroxy group bonding to the secondary carbon atom thereof, as the aliphatic diol having 2 or more and 6 or less carbon atoms, the content of the aliphatic diol having 3 or more and 6 or less carbon atoms and having a hydroxy group bonding to the secondary carbon atom thereof, is preferably 50 mol % or more, more preferably 60 mol % or more, and even more preferably 70 mol % or more, and is preferably 100 mol % or less, in the aliphatic diol having 2 or more and 6 or less carbon atoms, from the viewpoint of obtaining a toner excellent in the balance of various characteristics of low-temperature fusing property, storage stability, and durability.

From the viewpoint of more improving the low-temperature fusing property of toner, the content of the aliphatic diol having 3 or more and 6 or less carbon atoms and having a hydroxy group bonding to the secondary carbon atom thereof is, in the aliphatic diol having 2 or more and 6 or less carbon atoms, preferably 80 mol % or more, more preferably 90 mol % or more, even more preferably 100 mol %.

Also, the content of the aliphatic diol having 3 or more and 6 or less carbon atoms and having a hydroxy group bonding to the secondary carbon atom thereof is preferably 95 mol % or less, more preferably 90 mol % or less even more preferably 80 mol % or less, in the aliphatic diol having 2 or more and 6 or less carbon atoms, from the viewpoint of more improving the storage stability and durability of toner.

The alcohol component (a-al) may contain any other alcohol component different from BPA-AO and the aliphatic diol having 2 or more and 6 or less carbon atoms. Examples of the other alcohol component include any other aliphatic diol than an aliphatic diol having 2 or more and 6 or less carbon atoms, any other aromatic diol than BPA-AO, an alicyclic diol, and a trihydric or higher polyalcohol.

Examples of the other aromatic alcohol than BPA-AO include a 2,2-bis(4-hydroxyphenyl)propane polyoxypropylene adduct.

Examples of the other aliphatic diol than an aliphatic diol having 2 or more and 6 or less carbon atoms include 1,7-heptanediol, 1,8-octanediol, 1,9-nonanediol, 1,10-decanediol, 1,11-undecanediol, 1,12-dodecanediol, 1,13-tridecanediol, and 1,14-tetradecanediol.

Examples of the alicyclic diol include hydrogenated bisphenol A, and hydrogenated bisphenol A ($C_{2-4}$) alkylene oxide adducts (average addition molar number, 2 to 12).

Examples of the trihydric or higher polyalcohol include glycerin, pentaerythritol, trimethylolpropane, sorbitol, and sorbitan.

One alone or two or more kinds of these alcohol components may be used either singly or as combined. From the viewpoint of controlling the molecular weight and the softening point of the resultant polyesters, the alcohol component (a-al) may optionally contain a monohydric alcohol.

[Carboxylic Acid Component (a-ac)]

Examples of the carboxylic acid component that the carboxylic acid component (a-ac contains include dicarboxylic acids, tribasic or higher polycarboxylic acids, and derivatives such as anhydrides and ($C_{1-3}$) alkyl esters thereof.

The dicarboxylic acid includes aromatic dicarboxylic acids, aliphatic dicarboxylic acids, and alicyclic dicarboxylic acids, and at least one selected from the group consisting of aromatic dicarboxylic acids and aliphatic dicarboxylic acids is preferred.

The carbon number of the dicarboxylic acid is preferably 2 or more, more preferably 3 or more, and is preferably 30 or less, more preferably 20 or less.

The aromatic dicarboxylic acid includes phthalic acid, isophthalic acid, and terephthalic acid; and isophthalic acid and terephthalic acid are preferred, and terephthalic acid is more preferred.

The aliphatic dicarboxylic acid includes oxalic acid, malonic acid, maleic acid, fumaric acid, citraconic acid, itaconic acid, glutaconic acid, succinic acid, adipic acid, sebacic acid, 1,5-pentanedioic acid, 1,12-dodecanedioic acid, azelaic acid, and succinic acid substituted with an alkyl group having 1 or more and 20 or less carbon atoms or an alkenyl group having 2 or more and 20 or less carbon atoms (hereinafter also referred to as "alkenylsuccinic acid"); and at least one selected from the group consisting of fumaric acid, and succinic acid substituted with an alkyl group having 1 or more and 20 or less carbon atoms or an alkenyl group having 2 or more and 20 or less carbon atoms is preferred, and a mixture of two or more selected from the group consisting of fumaric acid, and succinic acid substituted with an alkyl group having 1 or more and 20 or less carbon atoms or an alkenyl group having 2 or more and 20 or less carbon atoms is more preferred.

The carbon number of the alkyl group or the alkenyl group that the alkenylsuccinic acid has is preferably 8 or more, more preferably 9 or more, and is preferably 16 or less, more preferably 14 or less. The alkyl group or the alkenyl group may be linear or branched. Preferred examples of the alkenylsuccinic acid include octenylsuccinic acid, nonenylsuccinic acid, decenylsuccinic acid, undecenylsuccinic acid, dodecylsuccinic acid, dodecenylsuccinic acid, tridecenylsuccinic acid, tetradecenylsuccinic acid, and tetrapropenylsuccinic acid.

The carboxylic acid component (a-ac) preferably contains an aromatic dicarboxylic acid among the above-mentioned dicarboxylic acids, and more preferably contains terephthalic acid.

The content of the aromatic dicarboxylic acid is preferably 50 mol % or more in the carboxylic acid component (a-ac), more preferably 60 mol % or more, even more preferably 65 mol % or more, further more preferably 70 mol % or more, and is 100 mol % or less, preferably 98 mol % or less, more preferably 95 mol % or less, even more preferably 90 mol % or less, further more preferably 85 mol % or less, from the viewpoint of obtaining a toner excellent in the balance of various characteristics of low-temperature fusing property, storage stability, and durability.

In the case where the carboxylic acid component (a-ac) contains an alkenylsuccinic acid, the content of the alkenylsuccinic acid is, preferably 3 mol % or more, more preferably 5 mol % or more, even more preferably 10 mol % or more, and is preferably 30 mol % or less, more preferably 20 mol % or less, even more preferably 15 mol % or less, in the carboxylic acid component (a-ac).

Examples of the tribasic or higher polycarboxylic acid include 1,2,4-benzenetricarboxylic acid (trimellitic acid), 2,5,7-naphthalenetricarboxylic acid, and pyromellitic acid. Among these, trimellitic acid is preferred.

In the case where the carboxylic acid component (a-ac) contains a tribasic or higher polycarboxylic acid, the content of the tribasic or higher polycarboxylic acid in the carboxylic acid component (a-ac) is preferably 3 mol % or more, more preferably 5 mol % or more, even more preferably 10 mol % or more, and is preferably 50 mol % or less, more preferably 40 mol % or less, even more preferably 30 mol % or less.

One alone or two or more kinds of these carboxylic acid components may be used either singly or as combined. From the viewpoint of controlling the molecular weight and the softening point of the resultant polyester, the carboxylic acid component (a-ac) may optionally contain a monocarboxylic acid.

The equivalent ratio of the carboxy group (COOH group) of the carboxylic acid component (a-ac) to the hydroxy group (OH group) of the alcohol component (a-al) [COOH group/OH group] is preferably 0.7 or more, more preferably 0.8 or more, and is preferably 1.3 or less, more preferably 1.2 or less, even more preferably 1.0 or less.

The content of the amorphous polyester-based resin in the resin (A) is preferably 70% by mass or more, more preferably 80% by mass or more, even more preferably 90% by mass or more, and is 100% by mass or less, preferably 100% by mass.

The content of the amorphous polyester in the resin (A) is preferably 70% by mass or more, more preferably 80% by mass or more, even more preferably 90% by mass or more, and is 100% by mass or less, preferably 100% by mass, from the viewpoint of easily obtaining a toner excellent in the balance of various characteristics of low-temperature fusing property, storage stability, and durability.

(Other Raw Material Component (e))

The raw material component for the resin (A) may use any other raw material component (e)) (hereinafter also referred to as "component (e)") along with the alcohol component (a-al) and the carboxylic acid component (a-ac), within a range not detracting from the advantageous effects of the present invention. The component (e) is not limited to a component that polycondensates along with the alcohol component (a-al) and/or the carboxylic acid component (a-ac), and may be any component that may be contained in the structure of the resultant resin.

The component (e) includes a monomer having different functional groups in one molecule, for example, lactic acid having a carboxy group and a hydroxy group; and a polyester component previously formed through polycondensation of a polyol component and an acid component. In the case where a polyester component previously formed through polycondensation of a polyol component and an acid component is incorporated, the component reacts with the above-mentioned alcohol component and carboxylic acid component to be taken in the structure of the polycondensed resin.

Examples of the other component (e) than the above-mentioned raw material components include raw material monomers for use for modification of an urethane-modified polyester or an epoxy-modified polyester, and styrene compounds such as α-methylstyrene for use for forming an addition polymer resin component in a composite resin; and vinylic monomers such as a vinyl monomer having an alkyl group with 6 or more and 22 or less carbon atoms such as 2-ethylhexyl (meth)acrylate, and bireactive monomers such as acrylic acid, methacrylic acid, and maleic acid.

The component (e) is preferably a polyester component previously formed by polycondensation of a polyol component and an acid component among the above-mentioned raw material components, more preferably a polyethylene terephthalate (hereinafter also referred to as "PET"). As PET, for example, usable are those produced through polycondensation of ethylene glycol and terephthalic acid or dimethyl terephthalate according to an ordinary method.

The intrinsic viscosity (hereinafter also referred to as "IV value") of PET is preferably 0.40 or more, more preferably 0.50 or more, even more preferably 0.55 or more, and is preferably 1.0 or less, more preferably 0.90 or less, even more preferably 0.80 or less, further more preferably 0.75 or less, further more preferably 0.70 or less. The IV value can be an index of a molecular weight, from the viewpoint of improving durability of toner. The IV value of PET can be controlled by controlling the time for polycondensation.

The IV value can be determined, for example, as follows. A sample is dissolved in a mixed solvent of phenol/tetrachloroethane=60/40 (ratio by mass) to have a concentration of 0.4 g/dL therein, and the viscosity thereof is measured with an Ubbelohde viscometer, and the IV value is calculated according to the following expression.

$$IV = (\sqrt{(1+4k\eta)} - 1)/(2kC)$$

In the expression, k is a Huggins constant, C is a concentration (g/dL) of the sample solution, $\eta = (t_1/t_0) - 1$, $t_0$ is a dropping time in second of the solvent alone, $t_1$ is a dropping time in second of the sample solution, and k is 0.33.

PET is available as a commercial product, and the commercial product thereof includes "RAMAPET L1" (from Indorama Ventures, Corp., IV value: 0.60), "RAMAPET N2G" (from Indorama Ventures Corp., IV value: 0.75), "TRN-MTJ" (from Teijin Limited, IV value: 0.53), and "TRN-RTJC" (from Teijin Limited, IV value: 0.64).

In the case where the resin (A) contains a polyester component previously formed through polycondensation of a polyol component and an acid component, the content of the polyester component each is preferably 25 parts by mol or more, more preferably 40 parts by mol or more, even more preferably 60 parts by mol or more, and is preferably 100 parts by mol or less, more preferably 90 parts by mol or less, even more preferably 80 parts by mol or less, relative to 100 parts by mol of the total amount of the alcohol component (a-al).

In the case where PET is used as the component (e), the molar number of PET is calculated as a molar number of the PET-derived ethylene glycol unit, and specifically, the value is calculated by dividing the amount of PET used (unit: g) by 192, in this description. The same shall apply to the molar number of the other polyester component than PET, and is calculated as a molar number of the polyester component-derived alcohol unit.

The component (e) may use the raw material components for the resin (C) along with the alcohol component (c-al) and the carboxylic acid component (c-ac), within a range not detracting from the advantageous effects of the present invention.

The softening point of the resin (A) is preferably 80° C. or higher, more preferably 90° C. or higher, even more preferably 100° C. or higher, further more preferably 110° C. or higher, from the viewpoint of more improving the storage stability and the durability of toner, or from the viewpoint of more improving the aging stability of low-temperature fusing property, and the charge property after storage thereof, and is preferably 160° C. or lower, more preferably 150° C. or lower, even more preferably 140° C. or lower, further more preferably 130° C. or lower, from the viewpoint of more improving the low-temperature fusing property of toner.

The glass transition temperature of the resin (A) is preferably 40° C. or higher, more preferably 50° C. or higher, even more preferably 55° C. or higher, further more preferably 60° C. or higher, from the viewpoint of more improving the storage stability and the durability of toner, or from the viewpoint of more improving the aging stability of low-temperature fusing property, and the charge property after storage thereof, and is preferably 90° C. or lower, more preferably 80° C. or lower, even more preferably 75° C. or lower, from the viewpoint of more improving the low-temperature fusing property of toner.

The acid value of the resin (A) is preferably 2 mgKOH/g or more, more preferably 5 mgKOH/g or more, even more preferably 10 mgKOH/g or more, and is preferably 40 mgKOH/g or less, more preferably 30 mgKOH/g or less, even more preferably 25 mgKOH/g or less, from the viewpoint of the interaction between the polyalkyleneimine-derived structure and the component in the resin composition (C-P), and from the viewpoint of easily obtaining a toner excellent in the balance of various characteristics of low-temperature fusing property, storage stability and durability, or from the viewpoint of easily obtaining a toner excellent in the balance of various characteristics of low-temperature fusing property, aging stability of low-temperature fusing property, and charge property after storage.

In the second embodiment, the SP value of the resin (A) is preferably 9.5 $(cal/cm^3)^{1/2}$ or more, more preferably 10.2 $(cal/cm^3)^{1/2}$ or more, even more preferably 10.5 $(cal/cm^3)^{1/2}$ or more, and is preferably 12.5 $(cal/cm^3)^{1/2}$ or less, more preferably 12.3 $(cal/cm^3)^{1/2}$ or less, even more preferably 12.1 $(\text{cal/cm}^3)^{1/2}$ or less, further more preferably 11.9 $(\text{cal/cm}^3)^{1/2}$ or less, from the viewpoint of more improving low-temperature fusing property, aging stability of low-temperature fusing property, and charge property after storage.

The softening point, the glass transition temperature, and the acid value of the resin (A) can be appropriately controlled by the kind and the ratio of the raw material monomer, and the production conditions of the reaction temperature, the reaction time and the cooling speed. These values can be determined according to the methods described in the section of Examples given hereinunder. In the case where two or more kinds of resins (A) are used in combination, preferably, the softening point, the glass transition temperature, and the acid value of the mixture thereof each fall within the above-mentioned range.

In the case where the resin (A) is an amorphous polyester, for example, the amorphous polyester can be produced through polycondensation of the alcohol component (a-al) and the carboxylic acid component (a-ac).

As needed, the polycondensation of the alcohol component (a-al) and the carboxylic acid component (a-ac) can be carried out in the presence of the component (e), an esterification catalyst, an esterification promoter and a polymerization inhibitor.

Preferred embodiments of the esterification catalyst, the esterification promoter and the polymerization inhibitor, and a preferred blending amount thereof are the same as those described hereinabove for the production method for the resin (C).

The polycondensation can be carried out in an inert gas atmosphere such as nitrogen.

The temperature in polycondensation of the alcohol component (a-al) and the carboxylic acid component (a-ac) is preferably 140° C. or higher, more preferably 160° C. or higher, even more preferably 180° C. or higher, and is preferably 250° C. or lower, more preferably 240° C. or lower, even more preferably 230° C. or lower.

Preferably, by reducing the pressure in the reaction system in a second half of polymerization, the reaction is promoted to control the resultant resin (A) so as to have a desired softening point.

<Difference in SP Value>

In the second embodiment, the difference in a Fedors solubility parameter (SP value) between the resin (C) and the resin (A) is 1.3 $(\text{cal/cm}^3)^{1/2}$ or less from the viewpoint of obtaining a toner excellent in low-temperature fusing property, aging stability of low-temperature fusing property, and charge property after storage.

The difference in the SP value is preferably 1.1 $(\text{cal/cm}^3)^{1/2}$ or less, more preferably 1.0 $(\text{cal/cm}^3)^{1/2}$ or less, even more preferably 0.9 $(\text{cal/cm}^3)^{1/2}$ or less, further more preferably 0.7 $(\text{cal/cm}^3)^{1/2}$ or less, further more preferably 0.5 $(\text{cal/cm}^3)^{1/2}$ or less, and is 0 $(\text{cal/cm}^3)^{1/2}$ or more.

The difference in the SP value means an absolute value of the difference between the SP value of the resin (C) and the SP value of the resin (A).

The ratio by mass of the amorphous resin (A) to the resin composition (C-P) [(A)/(C-P)] is preferably 65/35 or more, more preferably 75/25 or more, even more preferably 85/15 or more, from the viewpoint of obtaining a toner excellent in the balance of various characteristic of low-temperature fusing property, storage stability, and durability, or from the viewpoint of easily obtaining a toner excellent in the balance of various characteristics of low-temperature fusing property, aging stability of low-temperature fusing property, and charge property after storage, and is preferably 95/5 or less, more preferably 94/6 or less, even more preferably 92/8 or less, from the viewpoint of the aging stability of low-temperature fusing property and the durability of toner.

The total content of the amorphous resin (A) and the resin composition (C-P) is preferably 80% by mass or more, more preferably 90% by mass or more, even more preferably 95% by mass or more, and is 100% by mass or less, in 100% by mass of the binder resin composition. The total content of the amorphous resin (A) and the resin composition (C-P) is more preferably 100% by mass in 100% by mass of the binder resin composition.

[Production Method for Binder Resin Composition for Toner]

A production method for the binder resin composition for toner of the first embodiment of the present invention includes, from the viewpoint of obtaining a binder resin composition for toner excellent in low-temperature fusing property, storage stability, and durability, the following steps:

Step 1: a step of condensing an acid group-having crystalline resin (C) and a polyalkyleneimine to give a resin composition (C-P), and Step 2: a step of mixing the resin composition (C-P) and an amorphous resin (A).

In the production method for the binder resin composition for toner of the second embodiment of the present invention, the difference in a Fedors solubility parameter (SP value) between the crystalline resin (C) and the amorphous resin (A) is 1.3 $(\text{cal/cm}^3)^{1/2}$ or less in the above-mentioned production method, from the viewpoint of obtaining a binder resin composition for toner excellent in low-temperature fusing property, aging stability of low-temperature fusing property, and charge property after storage.

The crystalline resin (C), the polyalkyleneimine, the resin composition (C-P) and the amorphous resin (A), and preferred embodiments thereof are the same as those described hereinabove for the binder resin composition for toner, and the description of these is omitted here.

<Step 1>

The step 1 is a step of condensing an acid group-having crystalline resin (C) and a polyalkyleneimine to give a resin composition (C-P).

The temperature in condensation in the step 1 is preferably 50° C. or higher, more preferably 100° C. or higher, even more preferably 130° C. or higher, and is preferably 235° C. or lower, more preferably 200° C. or lower, even more preferably 170° C. or lower.

The condensation time in the step 1 is appropriately changeable but is preferably 10 minutes or more, more preferably 30 minutes or more, from the viewpoint of reactivity.

In the production method for the resin composition (C-P), an acid group-having crystalline resin (C) may be first formed and then condensed with a polyalkyleneimine, or a polyalkyleneimine may be added in the course of forming an acid group-having crystalline resin (C) and then condensed with the resin.

The blending amount of the polyalkyleneimine for use for condensation in the step 1 is preferably 0.05% by mass or more, more preferably 0.1% by mass or more, and is preferably 1% by mass or less, more preferably 0.5% by mass or less, relative to the total amount of the resultant resin composition (C-P) and the amorphous resin (A), from the viewpoint of obtaining a toner excellent in the balance of various characteristics of low-temperature fusing property, storage stability, and durability.

<Step 2>

The step 2 is a step of mixing the resin composition (C-P) obtained in the step 1 and an amorphous resin (A).

In the step 2, preferably, the two are mixed in such a manner that the ratio by mass of the amorphous resin (A) to the resin composition (C-P) [(A)/(C-P)] could be 65/35 or more and 95/5 or less.

A more preferred range of the ratio by mass [(A)/(C-P)] is also the same as the range described hereinabove for the binder resin composition for toner.

A method of mixing the resin composition (C-P) and an amorphous resin (A) is not specifically limited, for example, they may be uniformly mixed using a Henschel mixer.

Prior to adding various additives that will be described hereinunder in the column of a toner for developing electrostatic images, the additives may be previously mixed, or they may be mixed along with various additives.

In the case of simultaneously mixing them along with various additives, the same method as that to be described hereinunder for the production method for a toner for developing electrostatic images can be employed.

Mixing in the step 2 can be carried out using a kneading machine such as a closed system kneader, a single or twin-screw extruder, or a continuous open roll-type kneading machine, but a twin-screw extruder or a continuous open roll-type kneading machine is preferably used, from the viewpoint of improving dispersibility of a colorant and others to be mentioned below in the binder resin, and a twin-screw extruder is more preferred from the viewpoint of more improving the storage stability of toner.

The temperature in mixing in the step 2 is preferably 80° C. or higher, more preferably 90° C. or higher, and is preferably 150° C. or lower, more preferably 130° C. or lower.

[Toner for Developing Electrostatic Images]

The toner for developing electrostatic images of the present invention contains the above-mentioned binder resin composition for toner of the present invention.

The binder resin composition for toner of the present invention is preferably usable as a binder resin for the toner for developing electrostatic images. The toner may contain any other binder resin than the binder resin composition of the present invention, for example, any other resin such as a crystalline resin not having an acid group, within a range not detracting from the advantageous effects of the present invention.

The content of the binder resin composition of the present invention is preferably 80% by mass or more, more preferably 90% by mass or more, even more preferably 95% by mass or more, and is 100% by mass or less, in the total amount, 100% by mass of the binder resin for the toner for developing electrostatic images. The content of the binder resin composition of the present invention is more preferably 100% by mass in the total amount, 100% by mass of the binder resin for the toner for developing electrostatic images.

(Colorant)

The toner may contain a colorant.

The colorant may be any of dyes and pigments usable as a colorant for toner.

The dye includes azine dyes, anthraquinone dyes, perinone dyes, and rhodamine dyes, and examples thereof include C.I. Solvent Black 5, C.I. Solvent Black 7, Sprit Black SB, Toluidine Blue, C.I. Solvent Blue 11, C.I. Solvent Blue 12, C.I. Solvent Blue 35, C.I. Solvent Blue 59, C.I. Solvent Blue 74, 1-aminoanthraquinone, 2-aminoanthraquinone, hydroxyethylaminoanthraquinone, C.I. Solvent Violet 47, Solvent Orange 60, Solvent Orange 78, Solvent Orange 90, Solvent Violet 29, Solvent Red 135, Solvent Red 162, Solvent Red 179, and Rhodamine-B Base.

The pigment may be any of an inorganic pigment and an organic pigment.

The inorganic pigment includes carbon black and metal oxides.

The organic pigment includes azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments. The organic pigment is preferably one or more products selected from the group consisting of C.I. Pigment Yellow, C.I. Pigment Red, C.I. Pigment Orange, C.I. Pigment Violet, C.I. Pigment Blue, and C.I. Pigment Green.

The hue of the colorant is not specifically limited, and any of chromatic pigments of yellow, magenta, cyan, blue, red, orange and green is usable. One alone or two or more kinds of these colorants may be used either singly or as combined.

The content of the colorant is preferably 1 part by mass or more, more preferably 2 parts by mass or more, and is preferably 40 parts by mass or less, more preferably 20 parts by mass or less, even more preferably 10 parts by mass or less, relative to 100 parts by mass of the total amount of the binder resin, from the viewpoint of improving the image density of toner.

(Releasing Agent)

The toner may contain a releasing agent.

The releasing agent includes polypropylene wax, polyethylene wax, polypropylene-polyethylene copolymer wax; hydrocarbon waxes or their oxides such as microcrystalline wax, paraffin wax, Fischer-Tropsch wax, and Sasol wax; ester waxes such as carnauba wax, montan wax or deoxidized wax thereof, and fatty acid ester wax; and fatty acid amides, fatty acids, higher alcohols, and fatty acid metal salts. These may be used either singly or in combination of two or more thereof.

The melting point of the releasing agent is preferably 60° C. or higher, more preferably 70° C. or higher, even more preferably 80° C. or higher, from the viewpoint of the transferability of toner, and is preferably 150° C. or lower, more preferably 140° C. or lower, even more preferably 130° C. or lower, from the viewpoint of low-temperature fusing property.

The content of the releasing agent is preferably 0.5 parts by mass or more, more preferably 1 part by mass or more, even more preferably 1.5 parts by mass or more, and is preferably 10 parts by mass or less, more preferably 8 parts by mass or less, even more preferably 7 parts by mass or less, relative to 100 parts by mass of the total amount of the binder resin, from the viewpoint of the low-temperature fusing property and the offset resistance of toner.

(Charge Control Agent)

The toner may contain a charge control agent. The charge control agent may be any of a positive charge control agent and a negative charge control agent.

The positive charge control agent includes nigrosine dyes, for example, "Nigrosine Base EX", "Oil Black BS", "Oil Black SO", "BONTRON (registered trademark) N-01", "BONTRON (registered trademark) N-04", "BONTRON (registered trademark) N-07", "BONTRON (registered trademark) N-09", and "BONTRON (registered trademark) N-11" (all from Orient Chemical Industries Co., Ltd.); triphenylmethane dyes having a tertiary amine as a side chain, and quaternary ammonium salt compounds, for example, "BONTRON (registered trademark) P-51" (from Orient Chemical Industries Co., Ltd.), cetyltrimethylammonium bromide, and "COPY CHARGE PX VP435" (from Clariant Corporation); polyamine resins, for example, "AFP-B" (from Orient Chemical Industries Co., Ltd.); imidazole derivatives, for example, "PLZ-2001", and "PLZ-8001" (all from Shikoku Chemicals Corporation); and styrene-acrylic resins, for example "FCA-701PT" (from Fujikura Kasei Co., Ltd.).

The negative charge control agent includes metal-containing azo dyes, for example, "Barifast (registered trademark) Black 3804", "BONTRON (registered trademark) S-31", "BONTRON (registered trademark) S-32", "BONTRON (registered trademark) S-34", and "BONTRON (registered trademark) S-36" (all from Orient Chemical Industries, Co., Ltd.), "Aizenspiron Black TRH", and "T-77" (from Hodogaya Chemical Co., Ltd.); metal compounds of benzylic acid compounds, for example "LR-147" and "LR-297" (all from Japan Carlit Co., Ltd.); metal compounds of salicylic acid compounds, for example, "BONTRON (registered trademark) E-81", "BONTRON (registered trademark) E-84", "BONTRON (registered trademark) E-88", "BONTRON (registered trademark) E-304" (all from Orient Chemical Industries Co., Ltd.), and "TN-105" (from Hodogaya Chemical Co., Ltd.); copper phthalocyanine dyes: quaternary ammonium salts, for example, "COPY CHARGE PX VP434" (from Clariant Corporation), and nitroimidazole derivatives; and organic metal compounds. One alone or two or more of these charge control agents may be used either singly or as combined.

The content of the charge control agent is preferably 0.01 parts by mass or more, more preferably 0.2 parts by mass or more, even more preferably 0.5 parts by mass or more, relative to 100 parts by mass of the total amount of the binder resin, from the viewpoint of suppressing toner fogging, and is preferably 10 parts by mass or less, more preferably 5 parts by mass or less, even more preferably 3 parts by mass or less, further more preferably 2 parts by mass or less, relative to 100 parts by mass of the total amount of the binder resin, from the viewpoint of suppressing toner fogging, from the viewpoint of low-temperature fusing property.

(Other Additives)

The toner may appropriately further contain additives such as a magnetic powder, a fluidity enhancer, a conductivity controlling agent, a reinforcing filler such as a fibrous material, an antioxidant, an anti-aging agent, and a cleaning property enhancer as other additives thereto.

In this description, toner before added with an external additive to be mentioned below may also be referred to as "toner particles". The above-mentioned colorant, releasing agent, charge control agent and the other additives are preferably added to the toner before mixed with an external additive, and the toner particles are preferably in the form of a powder prepared by pulverizing and classifying a mixture containing the other components than an external additive.

(External Additive)

The toner may further contain an external additive for improving the fluidity thereof. Examples of the external additive include inorganic fine particles of silica, alumina, titania, zirconia, tin oxide or zinc oxide, and organic fine particles such as melamine resin fine particles, and polytetrafluoroethylene resin fine particles. The toner may contain one alone or two or more kinds of these external additives. Among these external additives, silica is preferred, and hydrophobic silica processed for hydrophobization is more preferred.

Examples of the hydrophobization treatment agent for hydrophobizing surfaces of silica particles include hexamethyldisilazane (HMDS), dimethyldichlorosilane (DMDS), silicone oil, octyltriethoxysilane (OTES), and methyltriethoxysilane. Among these, hexamethyldisilazane is preferred.

In the case where toner particles are surface-treated with an external additive, the amount of the external additive is preferably 0.05 parts by mass or more, more preferably 0.08 parts by mass or more, even more preferably 0.1 parts by mass or more, and is preferably 5 parts by mass or less, more preferably 3 parts by mass or less, even more preferably 2 parts by mass or less, relative to 100 parts by mass of toner particles, from the viewpoint of the charge property and the fluidity of toner.

The volume median particle diameter ($D_{50}$) of the toner is preferably 2 μm or more, more preferably 3 μm or more, even more preferably 4 μm or more, and is preferably 20 μm or less, more preferably 15 μm or less, even more preferably 10 μm or less. In this description, the volume median particle diameter ($D_{50}$) means a particle size at which a cumulative volume frequency calculated on the basis of a volume fraction of the particles from a smaller particle size side thereof is 50%.

In the case where the toner is processed with the above-mentioned external additive, the preferred range of the volume median particle diameter ($D_{50}$) of the toner processed with the external additive is the same as the volume median particle diameter ($D_{50}$) of the toner particles before processed with the external additive. The volume median particle diameter ($D_{50}$) may be determined by the method described in the section of Examples below.

[Production Method for Toner for Developing Electrostatic Images]

The toner for developing electrostatic images may be a pulverized toner or an emulsified and aggregated toner, and may be a toner for developing electrostatic images produced according to any conventionally-known method, and, for example, the following production methods (1) to (3) may be employed for producing the toner.

(1) Method of melt-kneading a raw material mixture for toner containing a binder resin composition and pulverizing the resulting melt-kneaded material to thereby produce a toner (hereinafter also referred to as "melt-kneading and pulverizing method");

(2) Method of aggregating and coalescing binder resin particles formed of a binder resin composition in a raw material mixture for toner which contains a dispersion prepared by dispersing a binder resin composition in a water-soluble medium to give toner particles to be a toner (hereinafter also referred to as "aggregating and coalescing method");

(3) Method of stirring a dispersion prepared by dispersing a binder resin composition in a water-soluble medium and raw materials for toner at a high speed to give toner particles to be a toner.

From the viewpoint of enhancing the productivity of toner as well as from the viewpoint of improving the low-temperature fusing property, the storage stability and the durability of toner, preferred is the melt-kneading and pulverizing method (1). In addition, a toner may also be produced by the aggregating and coalescing method (2).

In the case of producing the toner according to any of the aforementioned methods, the binder resin composition and the raw materials for the composition, as well as additives such as a colorant, a releasing agent and a charge control agent are the same as those described hereinabove for the binder resin composition for toner and the toner for developing electrostatic images of the present invention, and the preferred embodiments and the blending amount of the components (the same amount as the above-mentioned content and the blending amount) are also the same.

When the toner is produced by any of the aforementioned methods, the amount of the binder resin composition to be used is preferably 5% by mass or more, more preferably 30% by mass or more, even more preferably 50% by mass or more, further more preferably 70% by mass or more, further more preferably 80% by mass or more, further more preferably 85% by mass or more, further more preferably 90% by mass or more, and is 100% by mass or less, preferably 99% by mass or less, relative to 100 parts by mass of the total content (in terms of the solid content) of the raw materials for the toner to be produced.

(1) Melt-Kneading and Pulverizing Method

The method (1) preferably includes the following steps T1-1 and T1-2.

Step T1-1: a step of melt-kneading a raw material mixture for toner containing the binder resin composition of the present invention.

Step T1-2: a step of pulverizing the melt-kneaded material obtained in the step T1-1 and classifying the resulting pulverized product.

<Step T1-1>

In the step T1-1, a raw material mixture for toner containing the binder resin composition of the present invention is melt-kneaded. In the step T1-1, preferably, a raw material mixture for toner containing the binder resin composition of the present invention and further containing additives such as a colorant, a releasing agent and a charge control agent is melt-kneaded.

The melt-kneading may be conducted using a kneading machine such as a closed-type kneader, a single- or twin-screw extruder, or a continuous open roll kneader. From the viewpoint of improving the dispersibility of a colorant and others in a binder resin, a twin-screw extruder or a continuous open roll kneader is preferred, and from the viewpoint of more improving the storage stability of toner, a twin-screw extruder is more preferred.

In a twin-screw extruder, the kneading zone is closed, in which, therefore, materials can be readily melted by the kneading heat to be generated during kneading them.

The preset temperature of the twin-screw extruder is not influenced by the melting properties of materials owing to the mechanism of the extruder, and in the extruder, materials can be melted and mixed at an intended temperature.

The preset temperature (barrel preset temperature) of the twin-screw extruder can be appropriately defined, and is, for example, preferably 80° C. or higher, more preferably 90° C. or higher, and is preferably 150° C. or lower, more preferably 130° C. or lower.

The rotary peripheral speed of the twin-screw extruder is preferably 0.1 m/sec or more, more preferably 0.2 m/sec or more, even more preferably 0.3 m/sec or more, and is preferably 1.0 m/sec or less, more preferably 0.7 m/sec or less, even more preferably 0.5 m/sec or less, in the case of a co-rotation twin-screw extruder, from the viewpoint of improving the dispersibility of additives such as a colorant, a releasing agent and a charge control agent in the toner, and from the viewpoint of reducing the mechanical force in melt-kneading to suppress heat generation.

The open roll kneader is in the form of a kneader whose kneading section is not closed but opened such that heat of kneading generated upon the kneading can be readily released therefrom. In addition, the open roll kneader of a continuous type is preferably in the form of a kneader equipped with at least two rolls. The open roll kneader of a continuous type is a kneader equipped with two rolls that are different in peripheral speed from each other, i.e., a kneader equipped with a high speed rotating-side roll having a high peripheral speed and a low speed rotating-side roll having a low peripheral speed. From the viewpoint of improving the dispersibility of additives such as a colorant, a releasing agent and a charge control agent in the toner, from the viewpoint of reducing the mechanical force in melt-kneading to suppress heat generation, and from the viewpoint of lowering the temperature during melt-kneading, preferably, the high-rotation side roll is a heating roll and the low-rotation side roll is a cooling roll.

The roll temperature can be controlled by the temperature of the heating medium that is allowed to pass through inside the rolls. The heating temperature inside the rolls is preferably 20° C. or higher, more preferably 30° C. or higher and is preferably 150° C. or lower, more preferably 140° C. or lower.

The rotating speed of rolls is preferably 50 r/min or more, more preferably 100 r/min or more, even more preferably 150 r/min or more, and is preferably 350 r/min or less, more preferably 300 r/min or less, even more preferably 250 r/min or less, from the viewpoint of improving the dispersibility of additives such as a colorant, a releasing agent and a charge control agent in the toner, and from the viewpoint of reducing the mechanical force in melt-kneading to suppress heat generation.

The peripheral speed of rolls is preferably 0.07 m/min or more, more preferably 0.15 m/min or more, even more preferably 0.20 m/min or more, and is preferably 0.50 m/min or less, more preferably 0.45 m/min or less, even more preferably 0.40 m/min or less, from the viewpoint of improving the dispersibility of additives such as a colorant, a releasing agent and a charge control agent in the toner, and from the viewpoint of reducing the mechanical force in melt-kneading to suppress heat generation.

The structure, size, material and others of rolls are not particularly limited, and the surface of rolls may also have any shape such as a smooth shape, a wavy shape or an irregular shape. However, preferably, a plurality of spiral grooves are engraved on the surface of rolls from the viewpoint of enhancing a shear force upon kneading and improving dispersibility of additives such as a colorant, a releasing agent and a charge control agent in the toner, and from the viewpoint of reducing the mechanical force in melt-kneading to suppress heat generation.

Preferably, the raw material mixture for toner that contains the binder resin composition to be fed to the kneader is previously uniformly mixed using a Henschel mixer. Also, for example, the resin (A) and the resin composition (C-P) that the binder resin composition contains may be fed to the step 1 as a previously mixed binder resin composition, or in the step 1, the resin (A) and the resin composition (C-P) may be directly mixed and melt-kneaded to be a binder resin composition, and further may be mixed and melt-kneaded with additives such as a colorant.

In the case where the resin (A) and the resin composition (C-P) are mixed and melt-kneaded in the step T1-1, as described above, the two are preferably so mixed that the ratio by mass thereof [(A)/(C-P)] could be 65/35 or more and 95/5 or less. A more preferred range of the ratio by mass [(A)/(C-P)] is also the same as the range mentioned hereinabove for the binder resin composition for toner.

After the melt-kneaded material obtained in the step T1-1 is cooled so as to be pulverized, it is supplied to the subsequent step T1-2.

<Step T1-2>

In the step T1-2, the melt-kneaded material obtained in the step T1-1 is pulverized, and then classified.

The pulverization step may be conducted in multiple stages. For example, a resin kneaded material obtained by curing the melt-kneaded material may be coarsely pulverized into a size of 1 to 5 mm, and then the thus obtained coarsely pulverized product may be further finely pulverized into a desired particle size.

The pulverizer used in the pulverization step is not particularly limited. Examples of the pulverizer suitably used for the coarse pulverization include a hammer mill, an atomizer, and a Rotoplex. In addition, examples of the pulverizer suitably used for the fine pulverization include a jet mill such as a fluidized bed jet mill, and an impingement plate-type jet mill; and a rotating mechanical mill. Of these pulverizers, preferred is a jet mill from the viewpoint of improving pulverization efficiency.

Preferably, the pulverized product is further classified and controlled to have a desired particle size.

Examples of the classifier used for the classification step include a rotor-type classifier, an airflow-type classifier, an inertia classifier, and a sieve-type classifier. An insufficiently pulverized matter that has been removed in the classification step may be again processed in the pulverization step, and if desired, the pulverization step and the classification step may be repeated.

<Surface Treatment with External Additive>

The toner particles obtained in the step T1-2 can be used as a toner for developing electrostatic images as they are, but the toner particles may be further processed with an external additive.

The processing method is not specifically limited. Preferably, the toner particles are processed with an external additive using a mixing machine equipped with a stirring tool such as a rotary impeller. Employable herein is a mixing method preferably using a high-speed mixing machine such as a Henschel mixer or a super mixer, more preferably a Henschel mixer.

The toner particles and the external additive are the same as those mentioned hereinabove for the toner for developing electrostatic images of the present invention, and preferred embodiments and the amount to be added of the toner particles and the external additive are also the same.

(2) Aggregating and Coalescing Method

The method (2) preferably includes the following steps T2-1, T2-2 and T2-3.

Step T2-1: a step of obtaining an aqueous dispersion of binder resin particles containing the binder resin composition of the present invention.

Step T2-2: a step of aggregating the binder resin particles obtained in the step T2-1 and optionally raw materials for toner to give aggregated particles.

Step T2-3: a step of coalescing the aggregated particles obtained in the step T2-2.

<Step T2-1>

The aqueous dispersion of binder resin particles containing the binder resin composition of the present invention (hereinafter also referred to as an "aqueous dispersion") is preferably produced by the following step T2-1a.

Step T2-1a: a step of adding an aqueous medium to an organic solvent solution containing the binder resin composition of the present invention to subject the solution to phase inversion emulsification, thereby giving an aqueous dispersion of binder resin particles containing the binder resin composition.

In this description, the aqueous dispersion may be any one that contains binder resin compositions existing in a dispersed state in a solvent containing an aqueous medium. Preferably, the aqueous medium exists without being in a separate layer at 25° C. for 24 hours.

Also in this description, particles containing the binder resin composition that are contained in the aqueous dispersion may be referred to as "binder resin particles".

In the aqueous dispersion, any other organic solvent than an aqueous medium can exist, and the content of the aqueous medium in the total amount of the aqueous medium and the organic solvent is preferably 50% by mass or more, more preferably 70% by mass or more, even more preferably 80% by mass or more, further more preferably 85% by mass or more.

In the step of obtaining the aqueous dispersion containing the binder resin composition, a neutralizing agent and a surfactant may be mixed therein, further when needed.

In the following, a phase inversion emulsification method is described.

Phase inversion emulsification may be conducted by adding an aqueous medium to an organic solvent solution of the binder resin composition of the present invention. When adding an aqueous medium to an organic solvent solution, a W/O phase is first formed, and then this is subjected to phase inversion into an O/W phase. Whether the phase inversion takes place or not may be confirmed, for example, by observation by naked eyes, or measurement of electrical conductivity.

In the phase inversion step, the particle size of binder resin particles may be controlled by controlling the adding velocity and the amount of the aqueous medium to be added, as described below.

The organic solvent solution containing the binder resin composition can be produced according to a method of optionally mixing or kneading the resin binder composition and then dissolving or dispersing in an organic solvent.

Also for example, the resin (A) and the resin composition (C-P) that the binder resin composition contains may be previously mixed to give the binder resin composition and the resultant composition may be dissolved or dispersed in an organic solvent, or the resin (A) and the resin composition (C-P) may be independently, or simultaneously or successively, directly dissolved or dispersed in an organic solvent to give the binder resin composition, or the resin (A) is dissolved or dispersed in an organic solvent and the resin composition (C-P) is dissolved or dispersed in an organic solvent, and the resultant two organic solvents may be mixed to give the binder resin composition.

In the case where the resin (A) and the resin composition (C-P) are mixed to give the binder resin composition in the step T2-1a, preferably, the two are mixed in a ratio by mass [(A)/(C-P)] of 65/35 to 95/5, as described above. A preferred range of the ratio by mass [(A)/(C-P)] is also the same as the range thereof described hereinabove for the binder resin composition for toner.

When the mixture is stirred in this step, a common mixing and stirring device such as an anchor blade, or a high-speed stirring and mixing device such as Despa (from Asada Iron Works Co., Ltd.), T.K. Homomixer, T.K. Homodisper, and T.K. Robomix (all from Primix Corporation), Cleamix (from M Technique Corporation), and KD Mill (from KD International Corporation) can be used.

(Organic Solvent)

From the viewpoint of the solubility of the resin to be used therein, the organic solvent preferably has a solubility parameter (SP value: refer to "Polymer Handbook, Third Edition", published in 1989 by John Wiley & Sons, Inc.) of 15.0 MPa$^{1/2}$ or more, more preferably 16.0 MPa$^{1/2}$ or more and even more preferably 17.0 MPa$^{1/2}$ or more, and also preferably 26.0 MPa$^{1/2}$ or less, more preferably 24.0 MPa$^{1/2}$ or less and even more preferably 22.0 MPa$^{1/2}$ or less.

Examples of the organic solvent include alcohol solvents such as ethanol (26.0), isopropanol (23.5) and isobutanol (21.5); ketone solvents such as acetone (20.3), methyl ethyl ketone (19.0), methyl isobutyl ketone (17.2) and diethyl ketone (18.0); ether solvents such as dibutyl ether (16.5), tetrahydrofuran (18.6) and dioxane (20.5); and acetate solvents such as ethyl acetate (18.6) and isopropyl acetate (17.4). The parenthesized value on the right side of the name of each organic solvent is an SP value thereof and the unit is MPa$^{1/2}$. Among these, preferred is ketone solvent or acetate solvent, and one or more selected from methyl ethyl ketone, ethyl acetate and isopropyl acetate are preferred. Above all, ketone solvents are more preferred, and methyl ethyl ketone is even more preferred.

The ratio by mass of the organic solvent to the binder resin composition (organic solvent/binder resin composition) is preferably 0.1 or more, more preferably 0.2 or more and even more preferably 0.25 or more, and is also preferably 1 or less, more preferably 0.8 or less and even more preferably 0.7 or less.

(Neutralizing Agent)

In the step T2-1a, it is preferable to add a neutralizing agent to the binder resin composition from the viewpoint of improving the dispersion stability of the binder resin composition.

Examples of the neutralizing agent include hydroxides of alkali metals such as lithium hydroxide, sodium hydroxide and potassium hydroxide; ammonia; and organic base compounds such as trimethylamine, ethylamine, diethylamine, triethylamine, triethanolamine and tributylamine. Among these, sodium hydroxide is preferred.

The neutralization temperature is preferably 30° C. or higher, more preferably 50° C. or higher, even more preferably 60° C. or higher, and is preferably 90° C. or lower, more preferably 85° C. or lower, even more preferably 80° C. or lower.

In the case where a neutralizing agent is used, the equivalent (mol %) of the neutralizing agent to be used, is preferably 10 mol % or more, more preferably 20 mol % or more and even more preferably 30 mol % or more, and is also preferably 150 mol % or less, more preferably 100 mol % or less and even more preferably 80 mol % or less, on the basis of an acid group of the binder resin.

The equivalent (mol %) of the neutralizing agent to be used may be determined according to the following expression. In the case where the equivalent of the neutralizing agent used is 100 mol % or less, the equivalent of the neutralizing agent used has the same meaning as that of a degree of neutralization of the resin with the neutralizing agent.

Equivalent of neutralizing agent used (mol %)=
[{mass (g) of neutralizing agent added/equivalent of neutralizing agent}/[{weight average acid value of resin to constitute binder resin particles (mgKOH/g)×mass (g) of resin to constitute binder resin particles (g)}/(56×1,000)]]×100

(Aqueous Medium)

The aqueous medium preferably contains water as a main component.

Examples of components other than water include water-soluble organic solvents, e.g., aliphatic alcohols having 1 or more and 5 or less carbon atoms, such as methanol, ethanol, isopropanol and butanol; dialkyl ketones containing an alkyl group having 1 or more and 3 or less carbon atoms, such as acetone and methyl ethyl ketone; and cyclic ethers such as tetrahydrofuran. Among these, preferably used are alcohol-type organic solvents that do not dissolve polyester-based resins, such as methanol, ethanol, isopropanol and butanol, from the viewpoint of preventing them from being mixed in toner.

From the viewpoint of improving dispersion stability of binder resin particles, the content of water in the aqueous medium is preferably 80% by mass or more, more preferably 90% by mass or more and even more preferably 95% by mass or more, and is also 100% by mass or less, and further more preferably 100% by mass. Water is preferably ion-exchanged water or distilled water.

The temperature upon addition of the aqueous medium is preferably 15° C. or higher, more preferably 20° C. or higher and even more preferably 25° C. or higher, and is also preferably 80° C. or lower, more preferably 75° C. or lower, from the viewpoint of improving dispersion stability of binder resin particles.

From the viewpoint of improving dispersion stability of binder resin particles, the velocity of addition of the aqueous medium before phase inversion emulsification is preferably 0.1 parts by mass/minute or more, more preferably 1 part by mass/minute or more and even more preferably 3 parts by mass/minute or more, and is also preferably 50 parts by mass/minute or less, more preferably 20 parts by mass/minute or less and even more preferably 10 parts by mass/minute or less, on the basis of 100 parts by mass of the binder resin composition. The velocity of addition of the aqueous medium after phase inversion emulsification is not particularly limited.

From the viewpoint of improving dispersion stability of binder resin particles as well as from the viewpoint of obtaining uniform aggregated particles in the subsequent aggregation step, the amount of the aqueous medium to be added is preferably 100 parts by mass or more, more preferably 200 parts by mass or more and even more preferably 400 parts by mass or more, and is also preferably 900 parts by mass or less, more preferably 800 parts by mass or less and even more preferably 700 parts by mass or less, on the basis of 100 parts by mass of the binder resin composition.

(Surfactant)

In the step T2-1a, from the viewpoint of improving dispersion stability of the binder resin composition, preferably, a surfactant is added to the binder resin composition.

The surfactant include a nonionic surfactant, an anionic surfactant and a cationic surfactant. Among these surfactants, preferred are one or more selected from a nonionic surfactant and an anionic surfactant, and more preferred is an anionic surfactant, from the viewpoint of improving dispersion stability of binder resin particles.

The nonionic surfactant includes polyoxyethylene alkyl aryl ethers and polyoxyethylene alkyl ethers; such as polyoxyethylene nonyl phenyl ether, polyoxyethylene oleyl ether and polyoxyethylene lauryl ether; polyoxyethylene fatty acid esters, such as polyethylene glycol monolaurate, polyethylene glycol monostearate and polyethylene glycol monooleate; and oxyethylene/oxypropylene block copolymers. Among these, polyoxyethylene alkyl ethers are preferred from the viewpoint of improving dispersion stability of binder resin particles.

The anionic surfactant includes alkyl benzenesulfonic acid salts such as sodium alkylbenzenesulfonates; alkyl sulfuric acid salts such as sodium alkylsulfates; and alkyl ether sulfates such as sodium alkyl ether sulfates. Among these, preferred are sodium alkylbenzenesulfonates and alkyl ether sulfates, more preferred are alkyl ether sulfates, even more preferred are sodium alkyl ether sulfates, and further more preferred are sodium polyoxyethylene lauryl ether sulfate, from the viewpoint of improving dispersion stability of binder resin particles.

The cationic surfactant includes alkyltrimethylammonium chlorides, and dialkyldimethylammonium chlorides.

The surfactant may be mixed in an organic solvent solution and/or an aqueous dispersion containing the binder resin composition, before and/or after the above-mentioned phase inversion emulsification.

In the case where the surfactant is used, the amount of the surfactant to be added is preferably 0.5 parts by mass or more, more preferably 1 part by mass or more, even more preferably 2 parts by mass or more, and is preferably 20 parts by mass or less, more preferably 15 parts by mass or less, even more preferably 13 parts by mass or less, relative to 100 parts by mass of the binder resin composition, from the viewpoint of dispersion stability of binder resin particles.

(Removal of Organic Solvent)

After the phase inversion emulsification, if desired, the process may include a step of removing the organic solvent from the dispersion obtained through the phase inversion emulsification.

The method for removing the organic solvent is not specifically limited, but distillation is preferred. For distillation, preferably, the system is heated up to a temperature not lower than the boiling point of the organic solvent. From the viewpoint of maintaining the dispersion stability of binder resin particles, reduced-pressure distillation is more preferred. The organic solvent may remain in the aqueous dispersion, and the remaining amount thereof is preferably 1% by mass or less, more preferably 0.5% by mass or less, even more preferably substantially 0%, in the aqueous dispersion.

(Volume Median Particle Diameter ($D_{50}$) of Binder Resin Particles)

The volume median particle diameter ($D_{50}$) of the binder resin particles in the aqueous dispersion is preferably 100 nm or more, more preferably 150 nm or more and even more preferably 200 nm or more, and is also preferably 800 nm or less, more preferably 600 nm or less and even more preferably 300 nm or less.

Here, the volume median particle diameter ($D_{50}$) means a particle size at which a cumulative volume frequency calculated on the basis of a volume fraction of the particles from a smaller particle size side thereof is 50%, and may be determined by the method described in the section of Examples below.

<Step T2-2>

The step T2-2 is a step of aggregating the binder resin particles obtained in the step T2-1 to obtain aggregated particles.

In this step, an aggregating agent is preferably added to efficiently conduct aggregation of the binder resin particles. In addition, in the step T2-2, various additives such as a colorant, a charge control agent, a releasing agent, a magnetic powder, a conductivity controlling agent, a reinforcing filler such as a fibrous substance, and an antioxidant, an anti-aging agent and a cleaning property enhancer may be added.

(Aggregating Agent)

The aggregating agent for use herein includes organic aggregating agents such as cationic surfactants of quaternary salts and polyalkyleneimines; and inorganic aggregating agents such as inorganic metal salts and inorganic ammonium salts. Among these, preferred are inorganic aggregating agents, and more preferred are inorganic metal salts.

Examples of the inorganic metal salts include sodium sulfate, sodium chloride, calcium chloride, calcium nitrate, barium chloride, magnesium chloride, zinc chloride and aluminum chloride. Among these, preferred is calcium chloride. Preferably, the valence of the center metal of the inorganic metal salts is divalent or higher.

The amount of the aggregating agent to be used is preferably 0.10 parts by mass or more, more preferably 0.15 parts by mass or more and even more preferably 0.20 parts by mass or more, and also is preferably 5 parts by mass or less, more preferably 1 part by mass or less and even more preferably 0.5 parts by mass or less, on the basis of 100 parts by mass of the binder resin particles, from the viewpoint of well controlling the aggregation of binder resin particles to obtain aggregated particles having a desired particle size. The aggregating agent is preferably added in the form of an aqueous solution prepared by dissolving the aggregating agent in an aqueous medium.

The solid concentration in the system in the step T2-2 is preferably 5% by mass or more, more preferably 10% by mass or more and even more preferably 15% by mass or more, and is also preferably 50% by mass or less, more preferably 40% by mass or less and even more preferably 30% by mass or less, from the viewpoint of allowing uniform aggregation.

The temperature in the system during addition of an aggregating agent thereto is preferably 0° C. or higher, more preferably 10° C. or higher and even more preferably 15° C. or higher, and is also preferably 60° C. or lower, more preferably 55° C. or lower and even more preferably 50° C. or lower, from the viewpoint of improving productivity of toner.

(Colorant)

In the step T2-2, the colorant may be added in the form of a colorant dispersion containing colorant particles.

The volume median particle diameter ($D_{50}$) of colorant particles is preferably 50 nm or more, more preferably 80 nm or more and even more preferably 100 nm or more, and is also preferably 500 nm or less, more preferably 300 nm or less and even more preferably 150 nm or less, from the viewpoint of obtaining a toner capable of forming high-quality images.

(Releasing Agent)

In the step T2-2, the releasing agent may be added in the form of a releasing agent particle dispersion containing releasing agent particles.

The volume median particle diameter ($D_{50}$) of releasing agent particles is preferably 100 nm or more, more preferably 300 nm or more, and is preferably 1,000 nm or less, more preferably 700 nm or less, from the viewpoint of durability.

(Charge Control Agent)

In the step T2-2, the charge control agent may be added in the form of a charge control agent dispersion containing a charge control agent.

The volume median particle diameter ($D_{50}$) of charge control agent particles is preferably 100 nm or more, more preferably 300 nm or more, and is preferably 800 nm or less, more preferably 500 nm or less, from the viewpoint of low-temperature fusing property.

The volume median particle diameter ($D_{50}$) of the aggregated particles obtained in the step T2-2 is preferably 2 μm or more, more preferably 3 μm or more and even more preferably 4 μm or more, and is also preferably 10 μm or less, more preferably 9 μm or less and even more preferably 8 μm or less, from the viewpoint of low-temperature fusing property.

<Step T2-3>

The step T2-3 is a step of coalescing the aggregated particles obtained in the step T2-2. In this step, the particles that are present as aggregated particles under such a condition that they are allowed to adhere to each other mainly by a physical force solely are coalesced and integrated together to form coalesced particles.

In this step, the reaction system is preferably maintained at a temperature not lower than the glass transition temperature of the resin (A), from the viewpoint of improving the coalescing property of the aggregated particles.

From the viewpoint of improving the coalescing property of the aggregated particles and from the viewpoint of improving the productivity of toner, the holding temperature in this step is preferably not lower than a temperature higher by 5° C. than the glass transition temperature of the resin (A), more preferably higher by 10° C. than the glass transition temperature of the resin (A), even more preferably higher by 15° C. than the glass transition temperature of the resin (A), and is preferably not higher than a temperature higher by 50° C. than the glass transition temperature of the resin (A), more preferably not higher by 30° C. than the glass transition temperature of the resin (A), even more preferably not higher by 20° C. than the glass transition temperature of the resin (A).

Specifically, the holding temperature is preferably 70° C. or higher, more preferably 75° C. or higher, and is preferably 100° C. or lower, more preferably 90° C. or lower. The stirring speed is preferably such that the aggregated particles do not settle out at the speed.

In the case where an aggregation stopping agent is used, it is preferably a surfactant, more preferably an anionic surfactant. The anionic surfactant is preferably one or more selected from the group consisting of alkyl ether sulfate salts, alkyl sulfate salts, and linear alkylbenzenesulfonate salts, and alkyl ether sulfate salts are more preferred.

<Post-Treatment Step>

The coalesced particles obtained in the aforementioned step are then appropriately subjected to a solid-liquid separation step such as filtration, a washing step and a drying step to thereby favorably give the toner of the present invention.

In the washing step, preferably, the added surfactant is washed away, and preferably, the particles are washed with an aqueous solution of a nonionic surfactant at a temperature not higher than the clouding point of the surfactant. Also preferably, the washing is repeated plural times.

In the drying step, a vibration-type fluidized drying method, a spray drying method, a freeze drying method, or a flush jet method may be employed. The water content in the toner after drying is preferably 1.5% by mass or less, more preferably 1.0% by mass or less, from the viewpoint of charge property.

<Surface Treatment with External Additive>

The toner particles obtained via the steps T2-1 to T2-3 can be used as a toner for developing electrostatic images as they are, but the toner particles may be further processed with an external additive.

The processing method is not specifically limited. Preferably, the toner particles are processed with an external additive using a mixing machine equipped with a stirring tool such as a rotary impeller. Employable herein is a mixing method preferably using a high-speed mixing machine such as a Henschel mixer or a super mixer, more preferably a Henschel mixer.

The toner particles and the external additive are the same as those mentioned hereinabove for the toner for developing electrostatic images of the present invention, and preferred embodiments and the amount to be added of the toner particles and the external additive are also the same.

The toner for developing electrostatic images of the present invention, and the toner for developing electrostatic images obtained according to the production method of the present invention can be used as a one-component developing toner, or as a two-component developing toner mixed with a carrier, each in a one-component development system or two-component development system image forming device.

EXAMPLES

The properties of raw materials and others were measured and evaluated according to the following methods.

[Number-Average Molecular Weight (Mn) and Weight-Average Molecular Weight (Mw) of Polyalkyleneimine]

Molecular weight distribution was determined according to gel permeation chromatography (GPC) mentioned below, and the number-average molecular weight and the weight-average molecular weight were calculated.

(1) Preparation of Sample Solution

A polyalkyleneimine was dissolved in a solution prepared by dissolving 0.15 mol/L of $Na_2SO_4$ in an aqueous solution of 1% acetic acid so as to have a concentration of 0.2 g/100 mL. Next, the solution was filtered through a fluororesin filter "FP-200" (from Sumitomo Electric Industries, Ltd.) having a pore size of 0.2 μm to remove insoluble components to give a sample solution.

(2) Molecular Weight Measurement

A measurement device and an analytical column mentioned below were used. As an eluent, a solution prepared by dissolving 0.15 mol/L of $Na_2SO_4$ in an aqueous solution of 1% acetic acid was let to run through the column at a flow rate of 1 mL/min, and the column was stabilized in a constant-temperature bath at 40° C. 100 μL of the sample solution was introduced into the column and measured. The molecular weight of the sample was calculated based on the calibration curve previously prepared. For the calibration curve, used were a few kinds of standard pullulan (P-5 ($5.9 \times 10^3$), P-50 ($4.73 \times 10^4$), P-200 ($2.12 \times 10^5$), P-800 ($7.08 \times 10^5$) from Showa Denko K.K.) as standard samples. Measurement device: HLC-8320 GPC (from Tosoh Corporation) Analytical column: α+α-M+α-M (from Tosoh Corporation)

[Softening Point of Resin]

Using a flow tester "CFT-500D" (from Shimadzu Corporation), 1 g of a sample was extruded through a nozzle having a die pore diameter of 1 mm and a length of 1 mm while heating the sample at a temperature rise rate of 6° C./min and applying a load of 1.96 MPa thereto by a plunger. The softening point was determined as the temperature at which a half amount of the sample was flowed out when plotting a downward movement of the plunger of the flow tester relative to the temperature.

[Glass Transition Temperature of Resin]

Using a differential scanning calorimeter "DSC210" (from Seiko Instruments Inc.), 0.01 to 0.02 g of a sample was weighed in an aluminum pan, heated up to 200° C., and then cooled from that temperature to 0° C. at a temperature drop rate of 10° C./min. Next, the sample was heated at a temperature rise rate of 10° C./min. The temperature at which an extension of the baseline below the endothermic highest peak temperature was intersected with a tangential line having a maximum inclination of the curve in the range of from a rise-up portion to an apex of the peak was read as the glass transition temperature. When a peak is observed, the peak temperature is a glass transition temperature. When a peak is not observed and a height difference is observed, the temperature at which a tangential line having a maximum inclination of the curve in the height difference part is intersected with an extension of the baseline on the low-temperature side of the height difference is read as the glass transition temperature.

[Melting Point and Crystallinity Index of Resin]

Using a differential scanning calorimeter "Q-100" (from TA Instruments Japan Inc.), 0.01 to 0.02 g of a sample was weighed in an aluminum pan, and cooled from room temperature (20° C.) to 0° C. at a temperature drop rate of 10° C./min. Next, the sample was left as such for 1 minute, and then heated up to 180° C. at a temperature rise rate of 10° C./min to measure the quantity of heat. Among the observed endothermic peaks, the peak temperature for the largest peak area is referred to as an endothermic highest peak temperature (1).

For a crystalline polyester, the endothermic highest peak temperature (1) is the melting point of the crystalline polyester.

According to (softening point (° C.))/(endothermic highest peak temperature (1) (° C.)), the crystallinity index of the sample was calculated.

[Acid Value of Resin]

The acid value of resin was measured according to the method described in JIS K 0070-1992. In the method, however, the measurement solvent alone was changed from the mixed solvent of ethanol and ether defined in JIS K 0070-1992 to a mixed solvent of acetone and toluene (acetone/toluene=1/1 (ratio by volume)).

[Melting Point of Releasing Agent]

Using a differential scanning calorimeter "Q-100" (from TA Instruments Japan Inc.), 0.02 g of a sample was weighed in an aluminum pan, heated up to 200° C. and cooled from 200° C. to 0° C. at a temperature drop rate of 10° C./min. Next, the same was heated at a temperature rise rate of 10° C./min, the quantity of heat was measured, and the endothermic highest peak temperature is referred to as a melting point of the sample.

[Volume Median Particle Diameter ($D_{50}$) of Resin Particles, Colorant Particles, Releasing Agent Particles, and Charge Control Agent Particles, and Dispersoid in Mixed Solution of Dispersion Containing these Particles]

The volume median particle diameter ($D_{50}$) of resin particles, colorant particles, releasing agent particles, and charge control agent particles, and dispersoid in a mixed solution of a dispersion containing these particles was measured by the following method.

(1) Measurement Device: Laser Diffraction-Type Particle Sizer "LA-920" (from Horiba Ltd.)

(2) Measurement Conditions:

Distilled water was added to a measurement cell, and the volume median particle diameter ($D_{50}$) was measured at a concentration at which the absorbance could falls within an appropriate range.

[Solid Concentration of Aqueous Dispersion, Colorant Dispersion, Releasing Agent Particle Dispersion, and Charge Control Agent Dispersion]

Using an infrared moisture meter "FD-230" (from Kett Electric Laboratory), 5 g of a sample was dried at a drying temperature of 150° C. under a measuring mode 96 (monitoring time: 2.5 minutes, moisture variation range: 0.05%), and then subjected to measurement of a water content (% by mass) of the sample. The solid concentration was calculated according to the following expression.

Solid concentration (% by mass)=100−$M$

M: water content (% by mass) of sample

[Volume Median Particle Diameter ($D_{50}$) of Toner]

The volume median particle diameter ($D_{50}$) of toner was measured by the following method.

Measurement device: "Coulter Multisizer (registered trademark) III" (from Beckman Coulter Inc.)

Aperture diameter: 50 μm

Analyzing software: "Coulter Multisizer (registered trademark) III Version 3.51" (from Beckman Coulter Inc.)

Electrolyte solution: "Isotone (registered trademark) II" (from Beckman Coulter Inc.)

Dispersion:

"Emulgen (registered trademark) 109P" (polyoxyethylene lauryl ether, from Kao Corporation, HLB (hydrophile-lipophile balance, by Griffin method)=13.6) was dissolved in the above-mentioned electrolyte solution to prepare a dispersion having a concentration of 5% by mass.

Dispersing Condition:

Ten milligrams of a sample to be measured were added to 5 mL of the aforementioned dispersion, and dispersed therein using an ultrasonic disperser for 1 minute. Thereafter, 25 mL of the electrolyte solution was added to the resulting dispersion, and further dispersed using the ultrasonic disperser for 1 minute to prepare a sample dispersion.

Measurement Condition:

The thus prepared dispersion and 100 mL of the electrolyte solution were added to a beaker, and after controlling the concentration of the resultant dispersion in the beaker so as to complete measurement of particle sizes of 30,000 particles within 20 seconds, the particle sizes of the 30,000 particles in the dispersion were measured under this condition, and the volume median particle diameter ($D_{50}$) of the particles was determined from the resultant particle size distribution.

Production of Resin

Production Examples A1 to A4, A21 to A22

(Synthesis of Amorphous Polyesters A-1 to A-4, A-21 to A-22)

The alcohol components, the carboxylic acid components except trimellitic anhydride and fumaric acid, the esterification catalyst and the esterification promoter shown in Table 1 were put into a 10-L four-necked flask equipped with a thermometer, a stainless steel stirring bar, a dewatering tube with a falling type condenser, and a nitrogen inlet tube. The contents of the flask were heated up to 180° C. in a mantle heater in a nitrogen atmosphere and further heated up to 210° C. taking 5 hours. Thereafter, trimellitic anhydride and fumaric acid (fumaric acid was used in Production Examples A2, A4, A21 and A22) were put into the flask. The contents of the flask were heated up to 220° C., and at 8.0 kPa, reacted until reaching the softening point shown in Table 1 below to give amorphous polyesters A-1 to A-4, and A-21 to A-22 of an amorphous resin (A).

TABLE 1

| | | | Production Example A1 | | Production Example A2 | | Production Example A3 | | Production Example A4 | |
|---|---|---|---|---|---|---|---|---|---|---|
| Amorphous Resin (A) | | | A-1 | | A-2 | | A-3 | | A-4 | |
| | | | [g] | [part by mol] *1 | [g] | [part by mol] *1 | [g] | [part by mol] *1 | [g] | [part by mol] *1 |
| Raw Material Monomers | Alcohol Component | BPA-PO | 3674 | 50 | 7000 | 100 | | | | |
| | | BPA-EO | 3412 | 50 | | | | | | |
| | | 1,2-Propanediol | | | | | 3595 | 100 | 2377 | 70 |
| | | 1,4-Butanediol | | | | | | | 1206 | 30 |
| | Acid Component | Terephthalic Acid | 1987 | 57 | 1992 | 60 | 5497 | 70 | 4450 | 60 |
| | | Fumaric Acid | | | 116 | 5 | | | 259 | 5 |
| | | Alkenylsuccinic Anhydride | | | 508 | 10 | | | 1135 | 10 |
| | | Trimellitic Anhydride | 927 | 23 | 384 | 10 | 908 | 10 | 572 | 6.7 |
| | | | [g] | [part by mass] *2 | [g] | [part by mass] *2 | [g] | [part by mass] *2 | [g] | [part by mass] *2 |
| Esterification Catalyst | Tin(II) Di(2-ethylhexanoate) | | 50 | 0.5 | 50 | 0.5 | 50 | 0.5 | 50 | 0.5 |
| Esterification Promoter | Gallic Acid | | 5 | 0.05 | 5 | 0.05 | 5 | 0.05 | 5 | 0.05 |
| Properties | Softening Point [° C.] | | | 124.8 | | 118.2 | | 121.8 | | 126.8 |
| | Glass Transition Temperature [° C.] | | | 64.1 | | 61.2 | | 63.5 | | 67.5 |
| | Crystallinity Index | | | 1.9 | | 1.9 | | 1.9 | | 1.9 |
| | Acid Value [mgKOH/g] | | | 15.1 | | 20.0 | | 16.6 | | 13.1 |

| | | | Production Example A21 | | Production Example A22 | |
|---|---|---|---|---|---|---|
| Amorphous Resin (A) | | | A-21 | | A-22 | |
| | | | [g] | [part by mol] *1 | [g] | [part by mol] *1 |
| Raw Material Monomers | Alcohol Component | BPA-PO | 5093 | 70 | | |
| | | BPA-EO | 2027 | 30 | | |
| | | 1,2-Propanediol | | | 2458 | 70 |
| | | 1,4-Butanediol | | | 1247 | 30 |
| | Acid Component | Terephthalic Acid | 1898 | 55 | 4218 | 55 |
| | | Fumaric Acid | 121 | 5 | 161 | 3 |
| | | Alkenylsuccinic Anhydride | 264 | 5 | 587 | 5 |
| | | Trimellitic Anhydride | 599 | 15 | 1330 | 15 |
| | | | [g] | [part by mass] *2 | [g] | [part by mass] *2 |
| Esterification Catalyst | Tin(II) Di(2-ethylhexanoate) | | 50 | 0.5 | 50 | 0.5 |
| Esterification Promoter | Gallic Acid | | 5 | 0.05 | 5 | 0.05 |
| Properties | Softening Point [° C.] | | | 120.0 | | 123.5 |
| | Glass Transition Temperature [° C.] | | | 59.1 | | 58.5 |
| | Crystallinity Index | | | 2.0 | | 2.1 |
| | Fedors SP Value | | | 10.9 | | 11.6 |
| | Acid Value [mgKOH/g] | | | 17.4 | | 19.7 |

*1: This means part by mol of each monomer constituting the raw material monomers based on 100 parts by mol of the alcohol components in the raw material monomers.
*2: This means part by mol based on 100 parts by mass of the total amount of the raw material monomers.

Production Examples C1 to C5, C21 to C24

(Synthesis of Crystalline Polyesters C-1 to C-5, C-21 to C-24)

The alcohol component, the carboxylic acid component and the esterification catalyst shown in Table 2 were put into a 10-L four-necked flask equipped with a thermometer, a stainless steel stirring bar, a dewatering tube with a falling type condenser, and a nitrogen inlet tube. The contents of the flask were heated up to 140° C. in a mantle heater in a nitrogen atmosphere and further heated up to 200° C. taking 8 hours. Thereafter, at 8.0 kPa, the contents of the flask were reacted until reaching the softening point shown in Table 2 below to give crystalline polyesters C-1 to C-5, C-21 to C-24 of a crystalline resin (C).

TABLE 2

| | | | Production Example C1 | | Production Example C2 | | Production Example C3 | | Production Example C4 | | Production Example C5 | |
|---|---|---|---|---|---|---|---|---|---|---|---|---|
| Crystalline Resin (C) | | | C-1 | | C-2 | | C-3 | | C-4 | | C-5 | |
| | | | [g] | [part by mol]*1 | [g] | [part by mol]*1 | [g] | [part by mol]*1 | [g] | [part by mol]*1 | [g] | [part by mol]*1 |
| Raw Material Monomers | Alcohol Component | 1,12-Dodecanediol | 4676 | 100 | | | | | | | | |
| | | 1,10-Decanediol | | | | | 4311 | 100 | | | | |
| | | 1,6-Hexanediol | | | 3688 | 100 | | | | | | |
| | | 1,4-Butanediol | | | | | | | 2586 | 100 | | |
| | | Ethylene Glycol | | | | | | | | | 1938 | 100 |
| | Acid Component | Dodecanedioic Acid | 5324 | 100 | | | 5689 | 100 | | | | |
| | | Sebacic Acid | | | 6313 | 100 | | | | | | |
| | | Tetradecanedioic Acid | | | | | | | 7414 | 100 | 8063 | 100 |
| | | | [g] | [part by mass]*2 | [g] | [part by mass]*2 | [g] | [part by mass]*2 | [g] | [part by mass]*2 | [g] | [part by mass]*2 |
| Esterification Catalyst | Tin(II) Di(2-ethylhexanoate) | | 50 | 0.5 | 50 | 0.5 | 50 | 0.5 | 50 | 0.5 | 50 | 0.5 |
| Properties | Softening Point [° C.] | | | 93.4 | | 77.4 | | 86.8 | | 92.5 | | 95.8 |
| | Melting Point [° C.] | | | 84.1 | | 69.2 | | 77.8 | | 88.2 | | 91.0 |
| | Crystallinity Index | | | 1.1 | | 1.1 | | 1.1 | | 1.0 | | 1.1 |
| | Acid Value [mgKOH/g] | | | 13.0 | | 13.5 | | 10.9 | | 15.5 | | 18.2 |

| | | | Production Example C21 | | Production Example C22 | | Production Example C23 | | Production Example C24 | |
|---|---|---|---|---|---|---|---|---|---|---|
| Crystalline Resin (C) | | | C-21 | | C-22 | | C-23 | | C-24 | |
| | | | [g] | [part by mol]*1 | [g] | [part by mol]*1 | [g] | [part by mol]*1 | [g] | [part by mol]*1 |
| Raw Material Monomers | Alcohol Component | Ethylene Glycol | 3443 | 100 | 2349 | 100 | | | | |
| | | 1,4-Butanediol | | | | | 3516 | 100 | | |
| | | 1,6-Hexanediol | | | | | | | 5043 | 100 |
| | Acid Component | Succinic Acid | 6558 | 100 | | | | | | |
| | | Fumaric Acid | | | | | | | 4957 | 100 |
| | | Terephthalic Acid | | | | | 6484 | 100 | | |
| | | Sebacic Acid | | | 7652 | 100 | | | | |
| | | | [g] | [part by mass]*2 | [g] | [part by mass]*2 | [g] | [part by mass]*2 | [g] | [part by mass]*2 |
| Esterification Catalyst | Tin(II) Di(2-ethylhexanoate) | | 50 | 0.5 | 50 | 0.5 | 50 | 0.5 | 50 | 0.5 |
| Properties | Softening Point [° C.] | | | 100.6 | | 85.5 | | 111.5 | | 102.1 |
| | Melting point [° C.] | | | 101.5 | | 84.7 | | 115.0 | | 110.5 |
| | Crystallinity Index | | | 1.0 | | 1.0 | | 1.0 | | 0.9 |
| | Fedors SP Value | | | 11.7 | | 10.2 | | 11.9 | | 10.6 |
| | Acid Value [mgKOH/g] | | | 13.9 | | 14.9 | | 15.3 | | 14.9 |

*1This means part by mol of each monomer constituting the raw material monomers based on 100 parts by mol of the alcohol components in the raw material monomers.
*2This means part by mass based on 100 parts by mass of the total amount of the raw material monomers.

Production of Resin Composition (C-P)

Production Example CP1

(Production of Resin Composition CP-1)

500 g of the crystalline polyester resin C-1 was put into a 2-L four-necked flask equipped with a thermometer, a stainless steel stirring bar, a dewatering tube with a falling type condenser, and a nitrogen inlet tube. The contents of the flask were heated up to 150° C. in a mantle heater in a nitrogen atmosphere, and then 5 g of "Polyethyleneimine 300" (from Junsei Chemical Co., Ltd.) was added thereto, and reacted at 150° C. for 3 hours to give a resin composition CP-1 of a condensation product of the crystalline polyester C-1 and the polyethyleneimine.

The acid value of the resultant resin composition CP-1 was 7.5 mgKOH/g.

Production Examples CP2 to CP5

(Production of Resin Compositions CP-2 to CP-5)

According to the same method as in Production Example CP1 except that, in Production Example CP1, the crystalline polyester C-1 was changed to crystalline polyesters C-2 to C-5, resin compositions CP-2 to CP-5 of condensation products of the crystalline polyester C-2 to C-5 and the polyethyleneimine were produced.

Production Example CP6

(Production of Resin Composition CP-6)

According to the same method as in Production Example CP1 except that, in Production Example CP1, the amount of "Polyethyleneimine 300" added was changed to 3 g, a resin composition CP-6 of a condensation product of the crystalline polyester C-1 and the polyethyleneimine was produced.

Production Example CP7

(Production of Resin Composition CP-7)

According to the same method as in Production Example CP1 except that, in Production Example CP1, the amount of "Polyethyleneimine 300" added was changed to 49.5 g, a resin composition CP-7 of a condensation product of the crystalline polyester C-1 and the polyethyleneimine was produced.

Production Example CP8

(Production of Resin Composition CP-8)

According to the same method as in Production Example CP1 except that, in Production Example CP1, "Polyethyleneimine 300" was changed to "Polyethyleneimine 1800" (from Junsei Chemical Co., Ltd.), a resin composition CP-8 of a condensation product of the crystalline polyester C-1 and the polyethyleneimine was produced.

Production Examples CP21 to CP27

(Production of Resin Compositions CP-21 to CP-27)

According to the same method as in Production Example CP1 except that, in Production Example CP1, the kind and the added amount of the polyethyleneimine were changed as in Table 3, resin compositions CP-21 to CP-27 of condensation products of the resin (C) and the polyethyleneimine were produced.

Production of Toner of First Embodiment

Example 1

90 parts by mass of the amorphous polyester A-1, 10 parts by mass of the resin composition CP-1, 4 parts by mass of a colorant "Pigment Blue 15:3" (from Dainichiseika Color & Chemicals Mfg. Co., Ltd.), 0.85 parts by mass of a negatively-chargeable charge control agent "BONTRON (registered trademark) E-81" (from Orient Chemical Industries Co., Ltd.), and 2 parts by mass of a releasing agent "Mitsui Hi-Wax NP056" (polypropylene wax, from Mitsui Chemicals, Inc., melting point 124° C.) were uniformly mixed in a Henschel mixer to give a raw material mixture containing a binder resin composition for toner. Using a co-rotation twin-screw extruder, the resultant composition was melt-kneaded at a screw rotation speed of 200 r/min and at a barrel preset temperature of 100° C. to give a melt-kneaded product. The resultant melt-kneaded product was cooled, roughly pulverized, then milled with a jet mill, and classified to give toner particles having a volume median particle diameter ($D_{50}$) of 8.0 μm.

1.0 part by mass of a hydrophobic silica "NAX-50" (from Nippon Aerosil Co., Ltd., hydrophobizing agent: hexamethyldisilazane, volume median particle diameter ($D_{50}$): 30 nm) was added to 100 parts by mass of the resultant toner particles, and mixed in a Henschel mixer to give a toner 1.

The resultant toner 1 was evaluated according to the methods described below.

Examples 2 to 13

Toners 2 to 13 were produced in the same manner as in Example 1, except that the kind and the added amount of the amorphous polyester and the resin composition were changed as in Tables 4 to 5.

TABLE 3

| | | Production Example | | | | | | | |
|---|---|---|---|---|---|---|---|---|---|
| | | CP1 | CP2 | CP3 | CP4 | CP5 | CP6 | CP7 | CP8 |
| | | Resin Composition (C-P) | | | | | | | |
| | | CP-1 | CP-2 | CP-3 | CP-4 | CP-5 | CP-6 | CP-7 | CP-8 |
| Resin (C) | Kind | C-1 | C-2 | C-3 | C-4 | C-5 | C-1 | C-1 | C-1 |
| | Amount (g) | 500 | 500 | 500 | 500 | 500 | 500 | 500 | 500 |
| Polyethyleneimine | Kind*1 | PEI-300 | PEI-300 | PEI-300 | PEI-300 | PEI-300 | PEI-300 | PEI-300 | PEI-1800 |
| | Amount (g) | 5 | 5 | 5 | 5 | 5 | 3 | 49.5 | 5 |

| | | Production Example | | | | | | |
|---|---|---|---|---|---|---|---|---|
| | | CP21 | CP22 | CP23 | CP24 | CP25 | CP26 | CP27 |
| | | Resin Composition (C-P) | | | | | | |
| | | CP-21 | CP-22 | CP-23 | CP-24 | CP-25 | CP-26 | CP-27 |
| Resin (C) | Kind | C-21 | C-22 | C-23 | C-24 | C-21 | C-21 | C-21 |
| | Amount (g) | 500 | 500 | 500 | 500 | 500 | 500 | 500 |
| Polyethyleneimine | Kind*1 | PEI-300 | PEI-300 | PEI-300 | PEI-300 | PEI-300 | PEI-300 | PEI-1800 |
| | Amount (g) | 5 | 5 | 5 | 5 | 3 | 49.5 | 5 |

*1PEI-300: "Polyethyleneimine 300" (from Junsei Chemical Co., Ltd., Mn: 1500, Mw: 1800)

PEI-1800: "Polyethyleneimine 1800" (from Junsei Chemical Co., Ltd., Mn: 4400, Mw: 5300)

The resultant toners were evaluated according to the methods described below.

Example 14

A toner 14 was produced in the same manner as in Example 1, except that, in Example 1, the amorphous polyester A-1 was changed to a styrene-acrylic resin "Joncryl (registered trademark) 611" (from BASF SE, softening point 112° C., glass transition temperature 50° C., crystallinity index 2.2, acid value 53 mgKOH/g).

The resultant toner 14 was evaluated according to the methods described below.

Example 15

A toner 15 was produced in the same manner as in Example 1, except that, in Example 1, the co-rotation twin-screw extruder for use for melt-kneading the resultant raw material mixture was changed to a continuous two-open roll kneader "Kneadex" (from NIPPON COKE & ENGINEERING CO., LTD., roll outer diameter: 14 cm, effective roll length: 80 cm) to give a melt-kneaded product.

Regarding the operation condition for the continuous two-open roll kneader, the high-rotation side roll (front roll) rotation number was 75 r/min (peripheral speed 32.97 m/min), the low-rotation side roll (back roll) rotation number was 50 r/min (peripheral speed 21.98 m/min), and the roll clearance on the melt kneaded product supply port side end was 0.1 mm. Regarding the heating medium temperature and the cooling medium temperature inside the roll, the raw material mixture supply port side of the high-rotation side roll was 135° C., and the melt-kneaded product discharge port side thereof was 90° C.; and the raw material mixture supply port side of the low-rotation side roll was 35° C., and the melt-kneaded product discharge port side thereof was 35° C. The raw material mixture feeding speed was 10 kg/hr, and the average residence time was about 6 minutes.

The resultant melt-kneaded product was cooled, roughly pulverized, then milled with a jet mill, and classified to give toner particles having a volume median particle diameter ($D_{50}$) of 8.0 μm.

1.0 part by mass of a hydrophobic silica "NAX-50" (from Nippon Aerosil Co., Ltd., hydrophobizing agent: hexamethyldisilazane, volume median particle diameter ($D_{50}$): 30 nm) was added to 100 parts by mass of the resultant toner particles, and mixed in a Henschel mixer to give a toner 15.

The resultant toner 15 was evaluated according to the methods described below.

Example 16

(Production of Aqueous Dispersion of Binder Resin Particles)

90 g of the amorphous polyester A-1, 10 g of the resin composition CP-1, 60 g of methyl ethyl ketone, and 16.7 g (4.5 parts by mass relative to 100 parts by mass of binder resin composition) of an anionic surfactant "Emal (registered trademark) E27C (sodium polyoxyethylene lauryl ether sulfate: solid content 27% by mass)" (from Kao Corporation) were put into a 3-L vessel equipped with a stirrer, a reflux condenser, a dropping funnel, a thermometer and a nitrogen inlet tube, and dissolved at 73° C., taking 2 hours. An aqueous 5 mass % sodium hydroxide solution was added to the resultant solution so as to have a neutralization degree of 70 mol % relative to the weighted average acid value of the acid value of the amorphous polyester A-1 and the acid value of the resin composition CP-1, and stirred for 30 minutes.

This was kept stirred at 280 r/min (peripheral speed 88 m/min) still at 73° C., and 675 g of ion-exchanged water was added thereto, taking 77 minutes, for phase inversion emulsification. Still continuously kept at 73° C., methyl ethyl ketone was evaporated away under reduced pressure. Subsequently, with stirring at 280 r/min (peripheral speed 88 m/min), the dispersion was cooled to 30° C. Subsequently, the solid concentration of the dispersion was measured, and ion-exchanged water was added thereto so that the solid concentration thereof could be 20% by mass, thereby producing an aqueous dispersion of binder resin particles dispersed in an aqueous medium.

(Production of Colorant Dispersion)

50 g of copper phthalocyanine "ECB-301" (from Dainichiseika Color & Chemicals Mfg. Co., Ltd.), 5 g of a nonionic surfactant "EMULGEN 150" (polyoxyethylene lauryl ether, from Kao Corporation) and 200 g of ion-exchanged water were mixed and dispersed using a homogenizer for 10 minutes to give a colorant dispersion containing colorant particles. The volume median particle diameter ($D_{50}$) of the colorant particles was 120 nm, and the solid concentration was 22% by mass.

(Production of Releasing Agent Particle Dispersion)

50 g of paraffin wax "HNP9 (from Nippon Seiro Co., Ltd., melting point 85° C.), 5 g of a cationic surfactant "Sanisol (registered trademark) B50" (from Kao Corporation, alkylbenzyldimethylammonium chloride) and 200 g of ion-exchanged water were heated at 95° C., and dispersed using an ultrasonic homogenizer (from Doctor Hielscher GmbH, trade name: "UP-400S") at an output power of 350 W for 30 minutes to give a releasing agent dispersion containing releasing agent particles. The volume median particle diameter ($D_{50}$) of the paraffin wax (releasing agent particles) was 550 nm, and the solid concentration was 22% by mass.

(Production of Charge Control Agent Dispersion)

50 g of a salicylic acid-based compound "BONTRON (registered trademark) E-84" as a charge control agent (from Orient Chemical Industries Co., Ltd.), 5 g of a nonionic surfactant "EMULGEN 150" (from Kao Corporation) and 200 g of ion-exchanged water were mixed, and dispersed with glass beads using a sand grinder for 10 minutes to give a charge control agent dispersion containing charge control agent particles. The volume median particle diameter ($D_{50}$) of the charge control agent particles was 400 nm, and the solid concentration was 22% by mass.

(Production of Toner 16)

300 g of the aqueous dispersion of binder resin particles, 8 g of the colorant dispersion, 20 g of the releasing agent dispersion, 2 g of the charge control agent dispersion and 52 g of deionized water were put into a 2-L vessel, and with stirring with an anchor-type stirrer at 100 r/min (peripheral speed 31 m/min) at 20° C., 150 g of an aqueous 0.1 mass % calcium chloride solution was dropwise added thereto, taking 30 minutes. Subsequently, the resultant mixture was heated up to 50° C. with stirring, and kept at 50° C. After the volume median particle diameter ($D_{50}$) of the dispersoid in the mixture was confirmed to have reached 8.2 μm, a diluted liquid of 4.2 g of an anionic surfactant "EMAL (registered trademark) E27C" (from Kao Corporation, solid content 27% by mass) as an aggregation stopping agent, as diluted with 37 g of deionized water, was added thereto. Next, the mixture added with the diluted liquid was heated up to 80° C., and from the time at which the mixture reached 80° C., the mixture was kept at 80° C. for 1 hour, and thus the heating was ended. After coalesced particles were formed according to the operation, the system was gradually cooled down to 20° C., then filtered through a 150-mesh (150-μm opening) wire cloth, further filtered under suction, washed and dried to give toner particles. The volume median particle diameter ($D_{50}$) of the toner particles was 8.0 μm.

1.0 part by mass of hydrophobic silica "NAX-50" (from Nippon Aerosil Co., Ltd., hydrophobizing agent: hexamethyldisilazane, volume median particle diameter ($D_{50}$): 30 nm) was added to 100 parts by mass of the resultant toner particles, and mixed in a Henschel mixer to give a toner 16.

The resultant toner 16 was evaluated according to the methods described below.

Comparative Example 1

A toner 17 was produced in the same manner as in Example 1, except that in Example 1, the resin composition CP-1 was changed to the crystalline polyester C-1. The resultant toner 17 was evaluated according to the methods described below.

Comparative Example 2

A toner 18 was produced in the same manner as in Example 2, except that in Example 2, the resin composition CP-2 was changed to the crystalline polyester C-2. The resultant toner 18 was evaluated according to the methods described below.

Comparative Example 3

Toner particles were formed in the same manner as in Comparative Example 1, and 50 parts by mass of the toner particles and 450 parts by mass of pure water were put into a disposable cup and dispersed by stirring with an ultrasonic homogenizer. The particles were made to have a pH 2.5 with 0.3 M nitric acid added thereto, and then "Polyethyleneimine 300" was added thereto so as to be 0.1% by mass relative to the toner particles, and stirred for 1 hour. This was filtered under suction, and the resultant cake was washed with 1,500 parts by mass of pure water to give a washed cake. The washed cake was dried at 40° C. for 40 hours to give a toner 19. The resultant toner 19 was evaluated according to the methods described below.

Comparative Example 4

A toner 20 was produced in the same manner as in Example 1, except that in Example 1, the resin composition CP-1 was not added and a charge control agent "Polyethyleneimine 300" was added so as to be 0.1% by mass in the toner. The resultant toner 20 was evaluated according to the methods described below.

[Evaluation of Toner]
<Low-Temperature Fusing Property>

The toner was loaded into a copying machine "AR-505" (from Sharp Corporation), in which the fusing unit had been reformed so as to be fusable outside the machine, and unfused images (printing area: 3 cm×4 cm; amount of toner deposited: 0.45 mg/cm$^2$) were printed on paper "Copy Bond SF-70NA (75 g/m$^2$)" from Sharp Corporation. Subsequently, using a fusing unit controlled to give a total fusing pressure of 40 kgf (fusing speed 390 mm/sec), and elevating the temperature of the fusing roller from 100° C. up to 200° C. successively at intervals of 5° C., the unfused prints were printed at each temperature as a fusing test. An adhesive cellophane tape (Unisef Cellophane (from Mitsubishi Pencil Co., Ltd., width: 18 mm, JIS Z1522) was stuck to the image of the fused print, then led to pass through a fusing roller set at 30° C., and the adhesive cellophane tape was peeled. The reflection image density in the image part before the adhesive cellophane tape had been stuck thereto, and the reflection image density of the image part after the adhesive cellophane tape had been peeled were measured using a reflection densitometer "RD-915" (from GretagMachbeth Company), and the temperature of the fusing roller at which the ratio of the two (reflection image density after tape peeling/reflection image density before tape sticking)×100) has first exceeded 90% is referred to as a lowest fusing temperature. When the lowest fusing temperature is lower, the low-temperature fusing property of the toner is better.

<Storage Stability>

4 g of the toner was left in an environment at a temperature of 50° C. and a relative humidity of 60% for 72 hours. After thus left, the degree of toner aggregation occurrence was visually checked, and the storage stability of the toner was evaluated according to the following evaluation criteria.

<Evaluation Criteria>

A: Even after 72 hours, no aggregation was recognized.
B: After 48 hours, no aggregation was recognized, but after 72 hours, some aggregation was recognized.
C: After 24 hours, aggregation was not recognized, but after 48 hours, some aggregation was recognized.
D: Within 24 hours, aggregation was already recognized.

<Durability>

The toner was charged into a nonmagnetic one-component developing machine "MicroLine 5400" (from Oki Data Corporation), and tested in a printing durability test at a coverage rate of 0.3% and a printing speed of 300 sheets per hour, in an environment at a temperature of 35° C. and a relative humidity of 50%. The test is a continuous printing durability test, in which a solid image was printed once every hour, and checked for appearance of white streaks caused by toner filming on blades to evaluate printing durability. The test was stopped just when white streaks were confirmed to appear, and continued for at most 10 hours. Slower appearance of white streaks means more excellent durability. Specifically, a longer time shown in Tables 4 to 6 below means more excellent toner durability.

TABLE 4

| | Example 1 | Example 2 | Example 3 | Example 4 | Example 5 | Example 6 | Example 7 | Example 8 |
|---|---|---|---|---|---|---|---|---|
| Toner No. | 1 | 2 | 3 | 4 | 5 | 6 | 7 | 8 |
| Amorphous Resin (A) | A-1 | A-1 | A-1 | A-1 | A-1 | A-2 | A-3 | A-4 |
| Resin Composition (C-P) | CP-1 | CP-2 | CP-3 | CP-4 | CP-5 | CP-1 | CP-1 | CP-1 |
| Proportion of Polyethyleneimine [mass %]*3 | 0.1 | 0.1 | 0.1 | 0.1 | 0.1 | 0.1 | 0.1 | 0.1 |
| Polyethyleneimine | PEI-300 | PEI-300 | PEI-300 | PEI-300 | PEI-300 | PEI-300 | PEI-300 | PEI-300 |
| (A)/(C-P) [ratio by mass] | 90/10 | 90/10 | 90/10 | 90/10 | 90/10 | 90/10 | 90/10 | 90/10 |

TABLE 4-continued

|  |  | Example 1 | Example 2 | Example 3 | Example 4 | Example 5 | Example 6 | Example 7 | Example 8 |
|---|---|---|---|---|---|---|---|---|---|
| Evaluation Results | Lowest Fusing Temperature [° C.] | 130 | 130 | 130 | 130 | 130 | 130 | 130 | 135 |
|  | Storage Stability | A | A | A | A | A | B | B | A |
|  | Durability [hr] | 10 | 9 | 9 | 9 | 9 | 9 | 8 | 10 |

*3Blending amount relative to the total amount of the resin composition (C-P) and the amorphous resin (A)

TABLE 5

|  |  | Example 9 | Example 10 | Example 11 | Example 12 | Example 13 | Example 14 | Example 15*5 | Example 16 *6 |
|---|---|---|---|---|---|---|---|---|---|
| Toner No. |  | 9 | 10 | 11 | 12 | 13 | 14 | 15 | 16 |
| Amorphous Resin (A) |  | A-1 | A-1 | A-1 | A-1 | A-1 | St-Ac *4 | A-1 | A-1 |
| Resin Composition (C-P) |  | CP-1 | CP-1 | CP-6 | CP-7 | CP-8 | CP-1 | CP-1 | CP-1 |
| Proportion of Polyethyleneimine [mass %]*3 |  | 0.3 | 0.07 | 0.06 | 0.9 | 0.1 | 0.1 | 0.1 | 0.1 |
| Polyethyleneimine (A)/(C-P) [ratio by mass] |  | PEI-300 70/30 | PEI-300 93/7 | PEI-300 90/10 | PEI-300 90/10 | PEI-300 90/10 | PEI-300 90/10 | PEI-300 90/10 | PEI-300 90/10 |
| Evaluation Results | Lowest Fusing Temperature [° C.] | 130 | 140 | 135 | 135 | 135 | 135 | 130 | 135 |
|  | Storage Stability | B | A | B | B | A | C | B | B |
|  | Durability [hr] | 7 | 10 | 8 | 9 | 8 | 6 | 10 | 9 |

*3Blending amount relative to the total amount of the resin composition (C-P) and the amorphous resin (A)
*4Styrene-acrylic resin "Joncryl 611"
*5Melt-kneading in a roll kneader (in Examples 1 to 14, and Comparative Examples 1 and 2, melt-kneading in a twin-screw extruder)
*6Aggregating and coalescing method

TABLE 6

|  |  | Comparative Example 1 | Comparative Example 2 | Comparative Example 3 | Comparative Example 4 |
|---|---|---|---|---|---|
| Toner No. |  | 17 | 18 | 19 | 20 |
| Amorphous Resin (A) |  | A-1 | A-1 | A-1 | A-1 |
| Crystalline Resin (C) |  | C-1 | C-2 | C-1 |  |
| Proportion of Polyethyleneimine [mass %]*7 |  | 0 | 0 | 0.1 | 0.1 |
| Polyethyleneimine (A)/(C) [ratio by mass] |  | — 90/10 | — 90/10 | PEI-300 90/10 | PEI-300 100/0 |
| Evaluation Results | Lowest Fusing Temperature [° C.] | 145 | 145 | 145 | 160 |
|  | Storage Stability | D | D | D | B |
|  | Durability [hr] | 3 | 2 | 3 | 9 |

*7Blending amount relative to the total amount of the binder resin

As shown in Tables 4 and 5, it is known that the toners 1 to 16 for developing electrostatic images (Examples 1 to 16) each containing a binder resin composition for toner containing a resin composition (C-P) prepared by condensing an acid group-having crystalline resin (C) and a polyethyleneimine, and an amorphous resin (A) are excellent in all low-temperature fusing property, storage stability and durability.

As opposed to these, as shown in Table 6, it is known that the toners 17 and 18 for developing electrostatic images (Comparative Examples 1 and 2) not containing a resin composition (C-P) prepared by condensing an acid group-having crystalline resin (C) and a polyethyleneimine but containing, in place of it, a binder resin composition for toner containing an acid group-having crystalline resin (C), as well as the toner 19 for developing electrostatic images (Comparative Example 3) not containing a resin composition (C-P) prepared by condensing an acid group-having crystalline resin (C) and a polyethyleneimine but containing, in place of it, a binder resin composition for toner containing an acid group-having crystalline resin (C), and containing a polyethyleneimine as an external additive are all inferior to the toners 1 to 16 of Examples in point of low-temperature fusing property, storage stability and durability, and further, the toner 20 for developing electrostatic images (Comparative Example 4) prepared by adding a polyethyleneimine as a charge control agent to a binder resin composition for toner containing neither a resin composition (C-P) prepared by condensing an acid group-having crystalline resin (C) and a polyethyleneimine nor an acid group-having crystalline resin (C) is inferior to the toners 1 to 16 of Examples in point of low-temperature fusing property.

Production of Toner of Second Embodiment

Example 21

90 parts by mass of the amorphous polyester A-21, 10 parts by mass of the resin composition CP-21, 4 parts by mass of a colorant "Pigment Blue 15:3" (from Dainichiseika Color & Chemicals Mfg. Co., Ltd.), 0.85 parts by mass of a negatively-chargeable charge control agent "BONTRON (registered trademark) E-81" (from Orient Chemical Industries Co., Ltd.), and 2 parts by mass of a releasing agent "Mitsui Hi-Wax NP056" (polypropylene wax, from Mitsui Chemicals, Inc., melting point 124° C.) were uniformly mixed in a Henschel mixer to give a raw material mixture containing a binder resin composition for toner. Using a co-rotation twin-screw extruder, the resultant composition was melt-kneaded at a screw rotation speed of 200 r/min and at a barrel preset temperature of 100° C. to give a melt-kneaded product. The resultant melt-kneaded product was cooled, roughly pulverized, then milled with a jet mill, and classified to give toner particles having a volume median particle diameter ($D_{50}$) of 8.0 μm.

1.0 part by mass of a hydrophobic silica "NAX-50" (from Nippon Aerosil Co., Ltd., hydrophobizing agent: hexamethyldisilazane, volume median particle diameter ($D_{50}$): 30 nm) was added to 100 parts by mass of the resultant toner particles, and mixed in a Henschel mixer to give a toner 21.

The resultant toner 21 was evaluated according to the methods described below.

Examples 22 to 30

Toners 22 to 30 were produced in the same manner as in Example 21, except that the kind and the added amount of the amorphous polyester and the resin composition were changed as in Table 7.

The resultant toners were evaluated according to the methods described below.

Comparative Examples 21 to 22

Toners 31 and 32 were produced in the same manner as in Example 21, except that in Example 21, the resin composition CP-21 was changed to the crystalline polyester shown in Table 7. The resultant toners 31 and 32 were evaluated according to the methods described below.
[Evaluation of Toner]
<Low-Temperature Fusing Property>

Immediately after production, the toner was evaluated according to the above-mentioned evaluation method for low-temperature fusing property. The resultant lowest fusing temperature is referred to as a lowest fusing temperature ($T_1$).

⟨Aging Stability of Low-Temperature Fusing Property⟩

The toner was stored in a constant-temperature bath at a temperature of 40° C. for 3 days, and then evaluated for the lowest fusing temperature (T2) according to the same method as that for the above-mentioned low-temperature fusing property evaluation. A difference between T2 and T1 (T2−T1) was calculated to evaluate the aging stability of low-temperature fusing property.
<Charge Property after Long-Term Storage>

The toner was stored in an environment at a temperature of 40° C. and a relative humidity of 60% for 3 days, and then 0.6 g of the toner and 19.4 g of a silicon ferrite carrier (from Kanto Denka Kogyo Co., Ltd., average particle size: 90 μm) were put into a 50-mL polyethylene vessel, mixed at 250 r/min using a ball mill, and after mixed for 3600 seconds, the electric charge amount of the toner was measured using a Q/M meter (from EPPING GmbH) according to the following method.

After mixed, a regulated amount of the mixture of the toner and the carrier was put into the cell attached to the Q/M meter, and the toner alone was sucked for 90 seconds through a sieve having an opening of 32 μm (stainless, twill weave, wire diameter: 0.0035 mm). The voltage change on the carrier generated at that time was monitored, and a value of [total electric amount after 90 seconds (μC)/sucked toner amount (g)] was referred to as the electric charge amount of the toner (μC/g).
[Evaluation Criteria]
A: Electric charge amount 40 μC/g or more
B: Electric charge amount 30 μC/g or more and less than 40 μC/g
C: Electric charge amount 20 μC/g or more and less than 30 μC/g
D: Electric charge amount 10 μC/g or more and less than 20 μC/g
E: Electric charge amount less than 10 μC/g

TABLE 7

|  |  | Example 21 | Example 22 | Example 23 | Example 24 | Example 25 | Example 26 | Example 27 |
|---|---|---|---|---|---|---|---|---|
| Toner No. |  | 21 | 22 | 23 | 24 | 25 | 26 | 27 |
| Amorphous Resin (A) |  | A-21 | A-21 | A-21 | A-21 | A-22 | A-21 | A-21 |
| Resin Composition (C-P)/Crystalline Resin | Kind | CP-21 | CP-22 | CP-23 | CP-24 | CP-24 | CP-24 | CP-24 |
|  | Resin (C) | C-21 | C-22 | C-23 | C-24 | C-24 | C-24 | C-24 |
|  | Polyethyleneimine | PEI-300 | PEI-300 | PEI-300 | PEI-300 | PEI-300 | PEI-300 | PEI-300 |
|  | Proportion of Polyethyleneimine [mass %]*1 | 0.1 | 0.1 | 0.1 | 0.1 | 0.1 | 0.3 | 0.07 |
| (A)/(C-P) [ratio by mass] |  | 90/10 | 90/10 | 90/10 | 90/10 | 90/10 | 70/30 | 93/7 |
| ΔSP [(cal/cm$^3$)$^{1/2}$] *2 |  | 0.8 | 0.7 | 1.0 | 0.3 | 1.0 | 0.3 | 0.3 |
| Evaluation Results | Lowest Fusing Temperature $T_1$ [° C.] | 125 | 125 | 130 | 120 | 130 | 120 | 130 |
|  | Aging Stability of Low-Temperature Fusing Property [° C.] | 10 | 5 | 10 | 5 | 10 | 20 | 5 |
|  | Charge Property after long-term storage | B | B | B | A | C | D | A |

|  |  | Example 28 | Example 29 | Example 30 | Comparative Example 21 | Comparative Example 22 |
|---|---|---|---|---|---|---|
| Toner No. |  | 28 | 29 | 30 | 31 | 32 |
| Amorphous Resin (A) |  | A-21 | A-21 | A-21 | A-21 | A-21 |
| Resin Composition (C-P)/Crystalline Resin | Kind | CP-25 | CP-26 | CP-27 | C-22 | C-24 |
|  | Resin (C) | C-21 | C-21 | C-21 | — | — |
|  | Polyethyleneimine | PEI-300 | PEI-300 | PEI-1800 | — | — |
|  | Proportion of Polyethyleneimine [mass %]*1 | 0.06 | 0.9 | 0.1 | — | — |

TABLE 7-continued

|  |  |  |  |  |  |  |
|---|---|---|---|---|---|---|
| (A)/(C-P) [ratio by mass] |  | 90/10 | 90/10 | 90/10 | — | — |
| ΔSP [(cal/cm$^3$)$^{1/2}$] *2 |  | 0.3 | 0.3 | 0.3 | 0.7 | 0.3 |
| Evaluation Results | Lowest Fusing Temperature T$_1$ [° C.] | 120 | 120 | 130 | 130 | 120 |
|  | Aging Stability of Low-Temperature Fusing Property [° C.] | 25 | 15 | 20 | 40 | 40 |
|  | Charge Property after long-term storage | C | D | C | E | E |

*1 Blending amount relative to the total amount of the resin composition (C-P) and the amorphous resin (A)
*2: Difference in Fedors SP value between the crystalline resin (C) and the amorphous resin (A)

As shown in Table 7, it is known that the toners 21 to 30 for developing electrostatic images (Examples 21 to 30) each containing a binder resin composition for toner, which contains a resin composition (C-P) prepared by condensing an acid group-having crystalline resin (C) and a polyethyleneimine, and an amorphous resin (A) and in which the difference in a Fedors SP value between the crystalline resin (C) and the amorphous resin (A) is 1.3 (cal/cm$^3$)$^{1/2}$ or less, are excellent in all low-temperature fusing property, aging stability of low-temperature fusing property and charge property after storage.

As opposed to these, it is known that the toners 31 and 32 for developing electrostatic images (Comparative Examples 21 and 22) containing a binder resin composition for toner that does not contain a resin composition (C-P) prepared by condensing an acid group-having crystalline resin (C) and a polyethyleneimine but contains, in place of it, an acid group-having crystalline resin (C) are inferior to the toners 21 to 30 of Examples in point of aging stability of low-temperature fusing property and charge property after storage.

The invention claimed is:

1. A toner for developing electrostatic images comprising a binder resin composition, wherein the binder resin composition comprises:
   a resin composition (C-P) prepared by condensing an acid group-having crystalline resin (C) and a polyalkyleneimine; and
   an amorphous resin (A),
   wherein the acid group-having crystalline resin (C) is a crystalline polyester-based resin being a polycondensate of an alcohol component (c-al) and a carboxylic acid component (c-ac), in which the alcohol component (c-al) comprises an α,ω-aliphatic diol having 2 to 16 carbon atoms, and the carboxylic acid component (c-ac) comprises an α,ω-aliphatic dicarboxylic acid having 4 to 14 carbon atoms.

2. The toner according to claim 1, wherein a difference in a Fedors solubility parameter (SP value) between the crystalline resin (C) and the amorphous resin (A) is 1.3 (cal/cm$^3$)$^{1/2}$ or less.

3. The toner according to claim 1, wherein a ratio by mass of the amorphous resin (A) to the resin composition (C-P) [(A)/(C-P)] is from 65/35 to 95/5.

4. The toner according to claim 1, wherein a proportion of the polyalkyleneimine is from 0.05% by mass to 1% by mass relative to a total amount of the resin composition (C-P) and the amorphous resin (A).

5. The toner according to claim 1, wherein a number-average molecular weight of the polyalkyleneimine is from 800 to 5,000.

6. A method for producing a toner for developing electrostatic images comprising a binder resin composition, the method comprising adding the binder resin composition to raw materials of the toner, wherein the binder resin composition is prepared by the method comprising:
   condensing an acid group-having crystalline resin (C) and a polyalkyleneimine to obtain a resin composition (C-P); and
   mixing the resin composition (C-P) and an amorphous resin (A),
   wherein the acid group-having crystalline resin (C) is a crystalline polyester-based resin being a polycondensate of an alcohol component (c-al) and a carboxylic acid component (c-ac), in which the alcohol component (c-al) comprises an α,ω-aliphatic diol having 2 to 16 carbon atoms, and the carboxylic acid component (c-ac) comprises an α,ω-aliphatic dicarboxylic acid having 4 to 14 carbon atoms.

7. The method according to claim 6, wherein a difference in a Fedors solubility parameter (SP value) between the crystalline resin (C) and the amorphous resin (A) is 1.3 (cal/cm$^3$)$^{1/2}$ or less.

8. The method according to claim 6, wherein a ratio by mass of the amorphous resin (A) to the resin composition (C-P) [(A)/(C-P)] is from 65/35 to 95/5.

9. The toner according to claim 1, wherein the acid group-having crystalline resin (C) is a crystalline polyester, a crystalline composite resin having a polyester segment and a vinylic resin segment, or a combination thereof.

10. The toner according to claim 1, wherein the amorphous resin (A) is at least one resin selected from the group consisting of an amorphous polyester resin and a styrene-acrylic resin, wherein the amorphous polyester resin is an amorphous polyester or an amorphous composite resin having a polyester segment and a vinylic resin segment.

11. The toner according to claim 1, wherein a SP value of the crystalline resin (C) is from 9.5 (cal/cm$^3$)$^{1/2}$ to 12.5 (cal/cm$^3$)$^{1/2}$.

12. The method according to claim 6, wherein the condensing is performed for at least 10 minutes.

13. The method according to claim 6, wherein an amount of the polyalkyleneimine used in the condensing is from 0.05% by mass to 1% by mass relative to a total amount of the resultant resin composition (C-P) and the amorphous resin (A).

14. The toner according to claim 1, wherein the melting point of the acid group-having crystalline resin (C) is from 50° C. to 130° C.

15. The toner according to claim 1, wherein the alcohol component (c-al) is at least one selected from the group consisting of ethylene glycol, 1,4-butanediol, 1,6-hexanediol, 1,10-decanediol and 1,12-dodecanediol.

16. The toner according to claim 1, wherein the carboxylic acid component (c-ac) is at least one selected from the group consisting of sebacic acid, dodecanedioic acid, and tetradecanedioic acid.

17. The toner according to claim 1, wherein the carboxylic acid component (c-ac) is at least one selected from the group consisting of succinic acid, fumaric acid, and sebacic acid.

18. The toner according to claim 1, wherein the carboxylic acid component (c-ac) comprises an α,ω-aliphatic dicarboxylic acid having 10 to 14 carbon atoms.

19. The method according to claim 6, wherein the carboxylic acid component (c-ac) comprises an α,ω-aliphatic dicarboxylic acid having 10 to 14 carbon atoms.

20. The method according to claim 6, wherein the amorphous resin (A) is at least one resin selected from the group consisting of an amorphous polyester resin and a styrene-acrylic resin, wherein the amorphous polyester resin is an amorphous polyester or an amorphous composite resin comprising a polyester segment and a vinylic resin segment.

21. The method according to claim 6, wherein a number-average molecular weight of the polyalkyleneimine is from 800 to 5,000.

\* \* \* \* \*